US011505733B2

(12) United States Patent
Hughes et al.

(10) Patent No.: US 11,505,733 B2
(45) Date of Patent: Nov. 22, 2022

(54) AQUEOUS ACIDIC COMPOSITIONS WITH A CORROSION INHIBITOR

(71) Applicant: Schlumberger Technology Corporation, Sugar Land, TX (US)

(72) Inventors: Trevor Lloyd Hughes, Cambridge (GB); Evgeny Borisovich Barmatov, Cambridge (GB); Lynne Patricia Crawford, Essex (GB); Jill F. Geddes, Cambridge (GB); Man Yi Ho, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 46 days.

(21) Appl. No.: 16/849,685

(22) Filed: Apr. 15, 2020

(65) Prior Publication Data

US 2020/0332175 A1 Oct. 22, 2020

(30) Foreign Application Priority Data

Apr. 16, 2019 (GB) ...................................... 1905357
Apr. 16, 2019 (GB) ...................................... 1905364

(51) Int. Cl.
*C09K 8/54* (2006.01)
*C09K 8/74* (2006.01)
(52) U.S. Cl.
CPC . *C09K 8/54* (2013.01); *C09K 8/74* (2013.01)
(58) Field of Classification Search
CPC ...... C09K 2208/32; C09K 8/54; C09K 8/725; C09K 8/74
See application file for complete search history.

(56) References Cited

U.S. PATENT DOCUMENTS

| 3,773,465 A | 11/1973 | Keeney et al. |
| 5,002,673 A | 3/1991 | Williams et al. |
| 5,130,034 A | 7/1992 | Williams et al. |
| 5,209,859 A | 5/1993 | Williams et al. |
| 5,697,443 A | 12/1997 | Brezinski et al. |

(Continued)

FOREIGN PATENT DOCUMENTS

| CN | 110283581 A | 9/2019 |
| WO | 2015168430 A1 | 11/2015 |

(Continued)

OTHER PUBLICATIONS

Al Juhaiman, L.A., et al., "Polyvinyl Pyrrolidone as a Green Corrosion Inhibitor of Carbon Steel in Neutral Solutions Containing NaCl: Electrochemical and Thermodynamic Study", International Journal of Electrochemical Science, 2012, 7, pp. 8578-8596.

(Continued)

*Primary Examiner* — Frances Tischler

(57) ABSTRACT

An aqueous acid composition that may be used, for example, in a matrix acidizing treatment can include an acid, a polymeric acid corrosion inhibitor, and an acid corrosion inhibitor intensifier. The acid corrosion inhibitor can include iodide ions and metal ions, with the metal ions being one or more of copper, silver, bismuth, or antimony. The molar ratio of metal ions to iodide ions can be 1:X, where X is greater than or equal to 2. The polymer of the polymeric acid corrosion inhibitor can have a molecular weight less than 100,000 g/mol.

17 Claims, 14 Drawing Sheets

(56) References Cited

U.S. PATENT DOCUMENTS

| | | |
|---|---|---|
| 7,994,102 B2 | 8/2011 | Gupta et al. |
| 2010/0056405 A1 | 3/2010 | Ali et al. |
| 2011/0100630 A1 | 5/2011 | Evans et al. |
| 2016/0046796 A1* | 2/2016 | Krasnow ............ C08K 3/16 106/480 |
| 2017/0335467 A1 | 6/2017 | Barmatov et al. |
| 2018/0312980 A1 | 4/2018 | Barmatov et al. |
| 2018/0135187 A1 | 5/2018 | Crawford et al. |

FOREIGN PATENT DOCUMENTS

| | | |
|---|---|---|
| WO | 2016032445 A1 | 3/2016 |
| WO | 2020046670 A1 | 3/2020 |

OTHER PUBLICATIONS

Annand, R.R. et al., "Adsorption of Monomeric and Polymeric Amino Corrosion Inhibitors on Steel", Journal of the Electrochemical Society, 1965, 112(2), pp. 138-144.

Annand, R.R. et al., "Inhibition of Acid Corrosion by Soluble Monomer and Polymer Amines Containing Identical Functional Groups", Journal of the Electrochemical Society, 1965, 112(2), pp. 144-148.

Arthur, D.E. et al., "A review on the assessment of polymeric materials used as corrosion inhibitors of metals and alloys", International Journal of Industrial Chemistry, 2013, 4(2), 9 pages.

Banerjee, S. et al., "Chemically modified natural polysaccharide as green corrosion inhibitor for mild steel in acidic medium", Corrosion Science, 2012, 59, pp. 35-41.

Belkaid, S. et al., "Poly(4-vinylpyridine-hexadecyl bromide) as corrosion inhibitor for mild steel in acid chloride solution", Research on Chemical Intermediates, 2012, 38, pp. 2309-2325.

Benabdellah, M. et al., "The effect of poly(vinyl caprolactone-co-vinyl pyridine) and poly(vinyl imidazole-co-vinyl pyridine) on the corrosion of steel in H3P04 media", Journal of Applied Electrochemistry, 2007, 37, pp. 819-826.

Chetouani, A. et al. "Inhibition of Corrosion of Pure Iron by Quaternized Poly(4-Vinylpyridine)-Graft-Bromodecane in Sulphuric Acid", Intnational Journal of Electrochemical Science, 2012, 7, pp. 6025-6043.

Chetouani, A., et al., "Poly(4-vinylpyridine isopentyl bromide) as inhibitor for corrosion of pure iron in molar sulphuric acid", Progress in Organic Coatings, 2003, 46, pp. 312-316.

Chetouani, A et al., "Poly(4-vinylpyridine-poly(3-oxide-ethylene)tosyle) as an inhibitor for iron in sulphuric acid at 80° C.", Corrosion Science, 2004, 46, pp. 2421-2430.

Ding, Q. et al., "Corrosion Inhibition of Poly N-vinyl Imidazole for Q235 Steel in HCl Solution", Journal of Chinese Society for Corrosion and Protection, 2015, 35(1), 6 pages.

Finsgar, M. et al., "Application of corrosion inhibitors for steels in acidic media for the oil and gas industry: A review", Corrosion Science, 2014, 86 (2014), pp. 17-41.

Gao, B. et al., "Studies on preparing and corrosion inhibition behaviour of quaternised polyethylenimine for low carbon steel in sulfuric acid", Materials Chemistry and Physics, 2008, 108, pp. 375-381.

Jianguo, Y. et al., "Polyvinylpyrrolidone and Polyethylenimine as Inhibitors for the Corrosion of a Low Carbon Steel in Phosphoric Acid", Corrosion Science, 1995, 37, pp. 975-985.

Khaled, M.M. "The Effect of Molecular Weight on the Corrosion Protection Properties of Polyvinylpyrrolidone Polymers on Stainless Steel", The Arabian Journal for Science and Engineering, v35, No. IA, 29-39.

Kuznetsov, Y. I. et al., "Mixed Inhibitors and Some Aspects of Synergism in Corrosion Inhibition", NACE Paper 214 (Corrosion 96), 1998, 17 pages.

Larabi, L. et al., "Synergistic influence of poly(4-vinylpyridine) and potassium iodide on inhibition of corrosion of mild steel in IM HCl", Journal of Applied Electrochemistry, 2004, 34, pp. 833-839.

Manimaran, N. et al., "Corrosion Inhibition of Carbon Steel by Polyacrylamide", Research Journal of Chemical Sciences, 2013, 2(3), pp. 52-57.

Marques, L.C. D.C. et al., "Corrosion Problems Associated with the Use of Copper-Based Corrosion Inhibitor Intensifier in Acid Stimulation Treatments", SPE 23634, SPE Advanced Technologies, 1994, 2(1), 5 pages.

Rajeev, P. et al., "Corrosion mitigation of the oil well steels using organic inhibitors—A review", Journal of Materials and Environmental Science, 2012, 3(5), pp. 856-869.

Ren, Y. et al., "Lignin terpolymer for corrosion inhibition of mild steel in 10% hydrochloric acid", Corrosion Science, 2008, 50, pp. 3147-3153.

Robinson, G. et al., "Viscosity-Molecular Weight Relationsips, Intrinsic Chain Flexibility, and Dynamic Solution Properties of Guar Galactomannan", Carbohydrate Research, 1982, 107, pp. 17-32.

Rostami, A. et al., "Review and Evaluation of Corrosion Inhibitors Used in Well Stimulation", SPE 121726, presented at the 2009 SPE International Symposium on Oilfield Chemistry, The Woodlands, Texas, USA, 17 pages.

Roy, P. et al., "Corrosion inhibition of mild steel in acidic medium by polyacrylamide grafted Guar gum with various grafting percentage: Effect of intramolecular synergism", Corrosion Science, 2014, 88, pp. 246-253.

Seih, K. et al., "Development and Testing of a Novel Corrosion Inhibitor Technology for Acid Corosion", SPE 142675, presented at the 2011 SPE Middle East Oil and Gas Show and Conference, Manama, Bahrain, 13 pages.

Subramania, A. et al., "Polymeric Corrosion Inhibitors—An Overview", Bulletin of Electrochemistry, 2004, 20(2), pp. 49-58.

Tiu, B.D.B. et al., "Polymeric corrosion inhibitors for the oil and gas industry: Design principles and mechanism", Reactive and Functional Polymers, 2015, 95, pp. 25-45.

Umoren, S.A. et al. "Inhibition of mild steel corrosion in acidic medium using synthetic and naturally occurring polymers and synergistic halide additives", Corrosion Science, 2008, 50, pp. 1998-2006.

Umoren, S.A. et al., "Synergistic effect of iodide ion and polyacrylic acid on corrosion inhibition of iron in H2S04 investigated by electrochemical means", Corrosion Science, 2010, 52, pp. 2422-2429.

Umoren, S.A., "Synergistic Inhibition Effect of Polyethylene Glycol-Polyvinylpyrrolidone Blends for Mild Steel Corrosion in Sulphuric Acid Medium", Journal of Applied Polymer Science, 2011, 119, pp. 2072-2084.

Zhang, X. et al., "Anticorrosion Behaviors of Quaternary Polyethylenimine in Acidic Environment", Materials Science Forum, 2009, vols. 610-613, pp. 136-141.

Zou, C., et al. "Inhibiting evaluation of β-Cyclodextrin-modified acrylamide polymer on alloy steel in sulfuric acid", Corrosion Science, 2014, 85, pp. 445-454.

Combined Search and Examination Report issued in UK Patent Application No. GB1905357.8 dated Oct. 1, 2020, 3 pages.

\* cited by examiner

AQUEOUS ACIDIC COMPOSITIONS WITH A CORROSION INHIBITOR

CROSS-REFERENCE TO RELATED APPLICATIONS

This application claims the benefit of, and priority to, UK Patent Application No. 1905357.8, filed Apr. 16, 2019 and to UK Patent Application No. 1905364.4, filed Apr. 16, 2019. Each of the foregoing is expressly incorporated herein by this reference in its entirety.

BACKGROUND

Corrosion inhibitor compositions can be used to protect metal surfaces exposed to acidic aqueous solutions. Notably, ferrous metals such as carbon steel or various alloy steels undergo significant generalized and localized corrosion when in contact with aqueous acids and, particularly, under elevated temperature conditions. Examples of fields in which such contact is common include industrial acid cleaning, metal pickling operations, and during various different operations in oil and gas exploration and production.

In the oil and gas industry, exposure to acidic solutions may arise as a result of various operations such as: (i) subterranean matrix acidizing and acid fracturing treatments; (ii) oilfield production phase systems in which steel and alloy surfaces are exposed to acidic fluids associated with co-produced carbon dioxide and/or hydrogen sulphide); and (iii) during $CO_2$ pumping services in which steel and alloy surfaces are exposed to acidic fluids associated with injected carbon dioxide.

The technique of matrix acidizing involves exposure of wellbore steel to an injected acid. This operation may be performed with coiled tubing, which is run into the wellbore and then used to convey the acid to the region where the acid is to penetrate the rock formation. During such acid injection, the internal surface of the coiled tubing and a section of the wellbore casing is exposed to the acid. In the subsequent flowback phase, the steel casing in the wellbore and the exterior surface of the coiled tubing can be exposed to so-called 'unspent' acid flowing back with formation fluids to the surface.

Steel may be protected against corrosion by contacting the steel with an organic corrosion inhibitor that adsorbs to the metal surface. Adsorbed inhibitor(s) may influence the rate of corrosion by one or more of several mechanisms by: (i) forming a physical barrier film which restricts the diffusion of species to/from the metal surface; (ii) blocking anodic and/or cathodic reaction sites directly; (iii) interacting with corrosion reaction intermediates adsorbed on the surface; and (iv) influencing the electrical double layer that forms at the metal/solution interface.

Non-polymeric corrosion inhibitors predominate in commercial corrosion inhibitor formulations used for downhole operations and in associated research and development activities. Notwithstanding, it has been variously proposed and demonstrated over the last 50 years that polymeric corrosion inhibitors can show greater efficiency than their equivalent monomers. Notably, polymeric corrosion inhibitors can show effective inhibition when used at significantly lower dosages relative to non-polymeric corrosion inhibitors. Thus, because they can be used in lower dosages, polymeric corrosion inhibitors can provide a more environmentally friendly and cost-effective alternative to non-polymeric or monomeric corrosion inhibitors.

Corrosion inhibitor formulations may also include metal salt mixtures. The metal provided by the metal salt is used to complex with a quaternary ammonium compound and form a protective deposit on metal tubulars and equipment. Antimony ($SbCl_3$) is a metal salt that has previously been used.

Corrosion inhibitors can be used in combination with a corrosion inhibitor intensifier. An intensifier is a compound capable of enhancing the performance of a selected acid corrosion inhibitor. Corrosion inhibitor intensifiers are commonly used in environments in which the effectiveness of the corrosion inhibitor is reduced, such as, for example, at elevated temperatures.

Iodide is a known intensifier for both monomeric and polymeric corrosion inhibitors. Iodide's high selectivity as compared with anions of common mineral acids, e.g. hydrochloric acid, means that it is preferentially adsorbed to the surface of contacted metals, providing a minor inhibiting effect in its own right, and additionally providing a more preferential surface for the adsorption of corrosion inhibitor molecules. This process may not necessarily be sequential as there may also be significant co-adsorption of the iodide ions and inhibitor molecules. In some cases, a matrix acidizing fluid contains acid components, a corrosion inhibitor (e.g., quaternary ammonium compound), and a corrosion inhibitor intensifier (e.g., iodide ions and a source of formic acid).

Cuprous iodide may also be used as a corrosion inhibitor intensifier. In addition to iodide, the presence of copper ions provides an additional cathodic inhibition effect. Self-diverting formulations containing viscoelastic surfactant may also include cuprous iodide as a corrosion inhibitor intensifier. Other examples of aqueous acidic fluids for use with steel or Inconel can include water, acid, a corrosion inhibitor, a copper salt, and an alkali metal iodide (e.g., NaI or KI). The alkali metal iodide may generate copper/cuprous iodide in-situ, such as when the copper salt and the alkali metal iodide are present in approximately a 1:1 stochiometric ratio of copper to iodine.

Additional acidizing fluid compositions contain acid component(s), an acid corrosion inhibitor consisting of an acetylenic alcohol, and mixtures of organic nitrogen compounds and acetylenic alcohols, together with dissolved cuprous iodide, CuI, as a corrosion inhibitor intensifier. Example weight ratios of $Cu^+$ to $I^-$ of 1:2 may be used and equate to a molar ratio of 1:1. The copper and iodide ions may be provided through soluble precursor salts (e.g. CuCl+KI) for in-situ formation of cuprous iodide. The use of soluble salts has been correlated with a decreased degree of corrosion inhibition as compared with dissolved cuprous iodide, but the degree of corrosion inhibition can be improved by providing at least 5% molar excess of the salt (KI) supplying the iodide. Propargyl alcohol and alcohol-amine based inhibitors have been used experimentally with copper iodide intensifiers and a 5% molar excess of iodide, in recognition of galvanic corrosion caused by heterogeneous electrodeposition of copper metal forming micro-cathodes, which results in accelerated corrosion of the remainder of the ferrous surface, typically in the form of pitting. Notably, precipitated metals may not form a continuous coating but a "skeleton" deposit which leads to galvanic corrosion.

SUMMARY

According to one aspect of the present disclosure, aqueous formulations include one or more corrosion inhibitors. For instance, an aqueous acidic formulation can include an acid, a polymeric acid corrosion inhibitor, and an acid corrosion inhibitor intensifier. The corrosion inhibitor intensifier may include iodide ions and metal ions, with the metal ions including one or more of copper, silver, bismuth, or antimony.

According to another aspect that may be combined with any one or more other aspects herein, a formulation for reducing corrosion of a metal surface that is in contact with an acidic fluid may include a polymeric acid corrosion inhibitor and an acid corrosion inhibitor intensifier that includes iodide ions and metal ions. The metal ions can include copper, silver, bismuth, antimony, or any combination thereof.

According to another aspect that may be combined with any one or more other aspects herein, a method of reducing corrosion of a metal surface in contact with an acidic fluid includes providing the acidic fluid. The acidic fluid includes a polymeric acid corrosion inhibitor and an acid corrosion inhibitor intensifier including iodide ions and metal ions. The metal ions include copper, silver, bismuth, antimony, or any combination thereof.

According to another aspect that may be combined with any one or more other aspects herein, a method of treating a subterranean formation penetrated by a wellbore includes flowing an aqueous acidic formulation through a wellbore into the subterranean formation. The aqueous acidic formulation includes an acid and a polymeric acid corrosion inhibitor. The polymeric acid corrosion inhibitor may have a molecular weight less than 100,000 g/mol and be present at a concentration below its critical overlap concentration.

According to another aspect that may be combined with any one or more other aspects herein, an aqueous acidic formulation includes an acid, a polymeric acid corrosion inhibitor, and an acid corrosion inhibitor intensifier. The acid corrosion inhibitor intensifier can include iodide ions and metal ions, with a molar ratio of metal ions to iodide ions being 1:X, where X is greater than or equal to 2.

According to another aspect that may be combined with any one or more other aspects herein, a formulation for reducing corrosion of a metal surface in contact with an acidic fluid includes a polymeric acid corrosion inhibitor and an acid corrosion inhibitor intensifier. The intensifier may include iodide ions and metal ions, with a molar ratio of metal ions to iodide ions being is 1:X, where X is greater than or equal to 2.

According to another aspect that may be combined with any one or more other aspects herein, an aqueous acidic formulation or a formulation for reducing corrosion of a metal surface is part of a fluid for the treatment of a subterranean formation, and optionally such formation is within a borehole.

According to an aspect that may be combined with any other one or more aspects, a method of producing an inhibited acidic fluid includes adding a polymeric acid corrosion inhibitor to an acidic aqueous fluid, with the polymeric acid corrosion inhibitor including a polymer having a backbone that includes nitrogen-comprising repeat units modified to include groups with multiple fused aromatic rings. The degree of modification of the modified polymer may be selected in order to provide improved corrosion inhibition of a metal to be exposed to the inhibited acidic fluid relative to the corrosion inhibition provided by the non-modified polymer for that metal; and that the modified polymer is soluble in the acidic aqueous fluid.

In an aspect that may be combined with any one or more aspects herein, an inhibited acidic aqueous fluid including an acidic aqueous fluid and a polymeric acid corrosion inhibitor. The polymeric inhibitor including a polymer having a backbone with nitrogen-comprising repeat units modified to include a modifier with multiple fused aromatic rings.

In an aspect that may be combined with any one or more other aspects, a method of producing an inhibited acidic aqueous fluid, e.g., for use in a matrix acidizing treatment includes providing an acidic aqueous fluid with a polymeric acid corrosion inhibitor that includes a polymer having a backbone including nitrogen-comprising repeat units. At least some of the repeat units are modified to include a modifier with multiple fused aromatic rings. The polymer added to the acidic aqueous fluid is selected based on its degree of modification in order to: provide improved corrosion inhibition of a metal to be exposed to the inhibited acidic fluid relative to the corrosion inhibition provided by the non-modified polymer for that metal, and be substantially soluble in the acidic aqueous fluid.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIG. 4-1 is an SEM image of a steel sample surface following exposure to an aqueous acidic formulation including a CuI+KI intensifier package without a polymer acid corrosion inhibitor;

FIG. 4-2 is an SEM image of a steel sample surface following exposure to an aqueous acidic formulation including a polymeric inhibitor and a CuI+KI intensifier;

FIG. 10-1 is a plot derived from X-ray photoelectron spectroscopy (XPS) analysis indicating the degree of copper and iodide adsorption on steel samples exposed to aqueous acidic formulations containing PEI modified with naphthylmethyl and unmodified PEI polymeric acid corrosion inhibitors in the presence of CuI+KI, along with the control of CuI+KI in the absence of a polymeric acid corrosion inhibitor;

FIG. 10-2 is a plot derived from XPS analysis that indicates of the degree of copper and polymer adsorption on steel samples exposed to aqueous acidic formulations including modified PEI (PEI-NM) or unmodified PEI polymeric acid corrosion inhibitors in the presence of a CuI+KI corrosion inhibition intensifier;

FIG. 13-1 is a graph showing cumulative weight loss of steel samples exposed to aqueous acidic formulations including polyvinylpyridine (PVPy) polymeric acid corrosion inhibitors either unmodified or modified to varying degrees with benzyl groups, with testing of each polymeric acid corrosion inhibitor tested in the presence of iodide;

FIG. 13-2 is a graph showing cumulative weight loss of steel samples exposed to aqueous acidic formulations including polyvinylpyridine (PVPy) polymeric acid corrosion inhibitors either unmodified or modified to varying degrees with naphthylmethyl groups, with each of the polymeric acid corrosion inhibitors tested in the presence of different intensifier packages;

FIG. 14-1 is a chart showing cumulative weight loss of steel samples exposed to aqueous acid formulations including PVPy polymeric acid corrosion inhibitors unmodified and modified with benzyl or naphthylmethyl groups as a function of the degree of modification of the PVPy and in the presence of CuI+KI at a molar iodide-to-copper ratio of 10;

FIG. 14-2 is a chart showing cumulative ($1/R_p$) RCE results of steel samples exposed under dynamic flow conditions to aqueous acidic formulations including PVPy polymeric acid corrosion inhibitors either unmodified and modified with benzyl or naphthylmethyl groups in the presence of CuI+KI at a copper-to-iodide molar ratio of 1:10, and shown as a function of the degree of modification of the PVPy;

FIG. 15-1 is a plot derived from XPS analysis showing the degree of copper and iodide adsorption on steel samples exposed to aqueous acidic solutions including PVPy either unmodified or modified with naphthylmethyl groups and unmodified PEI each in the presence of CuI and KI, along with a control sample with no polymeric acid corrosion inhibitor;

FIG. 15-2 is a plot derived from XPS analysis showing the degree of polymer and iodide adsorption on steel samples exposed to aqueous acidic solutions including PVPy either unmodified or modified with naphthylmethyl groups and unmodified PEI each in the presence of CuI and KI;

DETAILED DESCRIPTION

Figure 1:
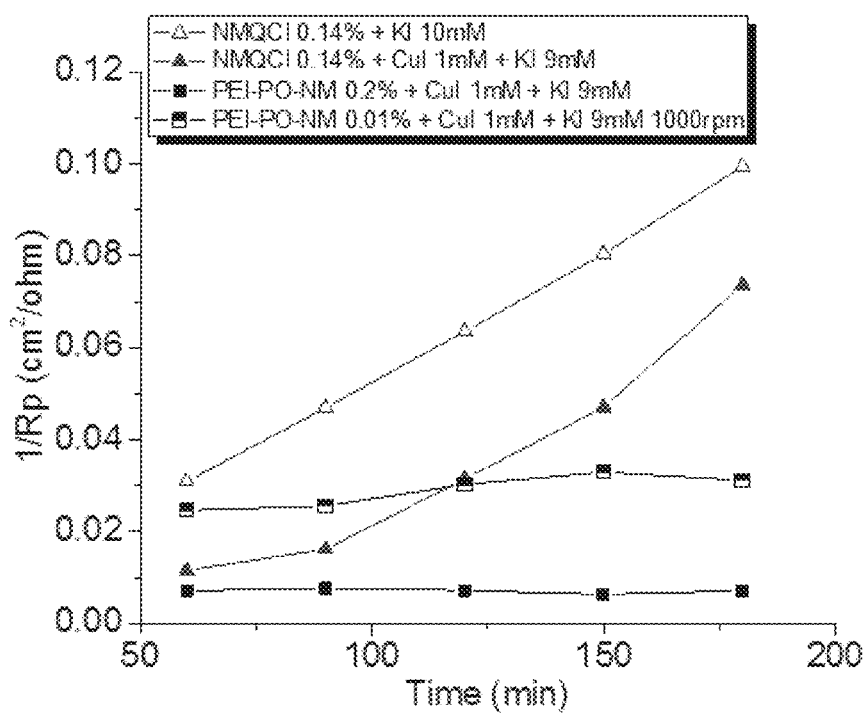
FIG. 1 is a graph comparing rotating cylinder electrode (RCE) tests of steel samples exposed to aqueous acidic formulations including monomeric or polymeric corrosion inhibitors with either a CuI+KI inhibitor intensifier package including an iodide concentration or a copper-free KI intensifier package (KI)

Embodiments of the present disclosure relate to aqueous acidic compositions including a polymeric acid corrosion inhibitor (ACI). More particular embodiments relate to aqueous acidic compositions including a polymeric acid corrosion inhibitor and a corrosion inhibitor intensifier. As described herein, a broad range of different polymeric acid corrosion inhibitors can be used in conjunction with various corrosion inhibitor intensifiers, to obtain various degrees of performance for acid corrosion. Nevertheless, the examples disclosed herein should be considered illustrative and not restrictive in nature.

Synthesis of Poly (4-Vinylpyridine) Modified with Benzyl

Poly (4-vinylpyridine) weight average molecular weight 60,000 g/mol, supplied by SIGMA ALDRICH (1 g) and benzyl chloride (weight used dependent on the degree of modification required) were combined in ethanol (30 ml) and heated at reflux for 19 hr. The solution was cooled, the solvent removed, and the residue partitioned between water (≈35 ml) and ethyl acetate (≈10 ml). The aqueous phase was removed, extracted with ethyl acetate and freeze dried to give the modified polymer which was used without further purification.

Molecular weights of example benzyl modified PVPy polymers are given in Table 1 below.

TABLE 1

| % of Benzyl Modification | M. wt (calculated) (g/mol) |
|---|---|
| 50 | 96,172 |
| 25 | 76,542 |
| 12 | 68,708 |

The structural formula of a repeat unit of PVPy and its modification to include a naphthylmethyl modifier are shown in Equation 1 below:

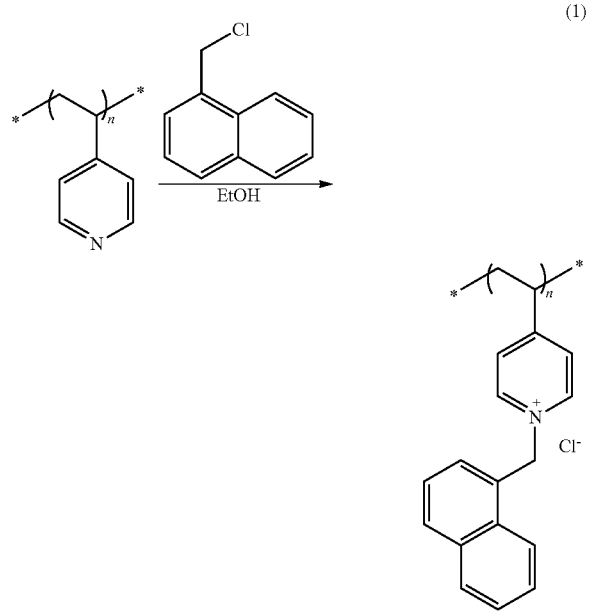

(1)

Synthesis of Poly (4-Vinylpyridine) Modified with Methylnapthyl

Poly (4-vinylpyridine) as described above (1 g) and 1-(chloromethyl)naphthalene (weight dependant on degree of modification required) were combined in ethanol (30 ml) and heated at reflux for 19 hr. The solution was cooled, and the solvent removed. Water and ethyl acetate were added to the residue, the liquor decanted, and the residue dissolved in ethanol and the solvent removed. The glassy solid was triturated with ethyl acetate and dried. The solid was washed with ethyl acetate via soxhlet extraction, dried, washed with diethyl ether, and dried to give the modified polymer which was used without further purification. Molecular weights of example methylnapthyl modified PVPy polymers are given in Table 2 below.

TABLE 2

| % of Methylnapthyl Modification | M. wt (calculated) (g/mol) |
|---|---|
| 25 | 83,232 |
| 10 | 67,095 |

Synthesis of PEI Modified with Methylnaphthyl

Equation 2 provides the structural formula of PEI and an example profess to modify this to include naphthylmethyl modifier groups for use as an acid corrosion inhibitor. In the examples described below, the PEI used for modification had a weight average molecular weight of 2,000 g/mol.

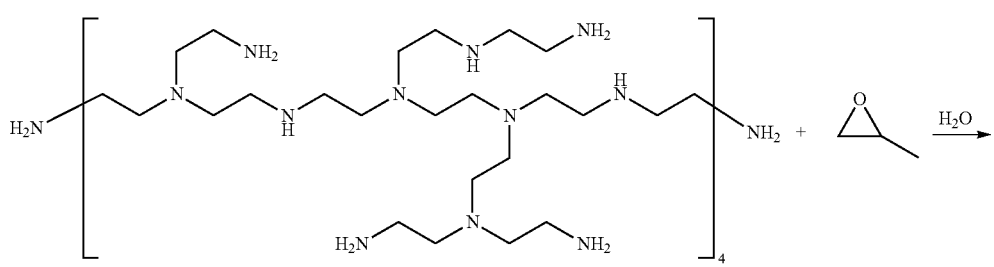

(2)

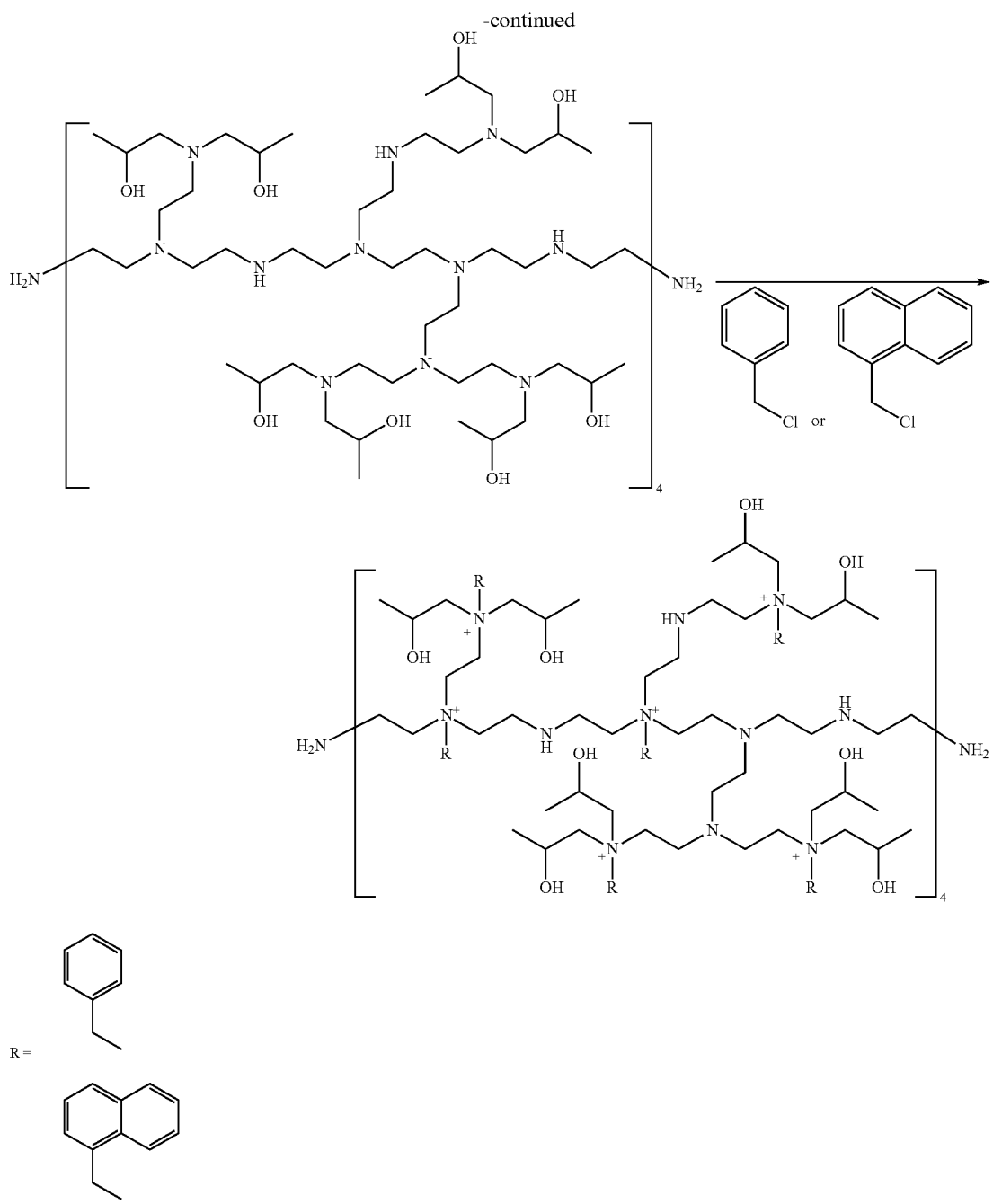

Synthesis of PEI modified with methylnaphthyl occurred in a two-stage synthesis process. In the first stage, PEI (weight average molecular weight 2,000 g/mol supplied by SIGMA ALDRICH) (2 g, 50% in water) was dissolved in water (20 ml) and cooled to 5° C. Propylene oxide (1.3 g) was added and the mixture stirred for 1.5 hr, and was at ambient temperature for 19 hr. The residual propylene oxide was removed by heating to 50° C. and purged with nitrogen for 2 hr. High vacuum was applied for 10 min. and the resultant aqueous solution freeze dried to give PEI modified with 2-hydroxypropyl groups (2.23 g), which was used without further purification.

In the second stage, PEI modified with 2-hydroxypropyl groups (997 mg) was dissolved in acetonitrile and 1-(chloromethyl)naphthalene (weight dependent on the degree of modification required) was added, and the mixture heated at reflux for 24 hr. The solvent was removed, and the residue partitioned between water and ethyl acetate. The aqueous phase was removed, extracted with ethyl acetate and freeze dried to give the PEI modified with methylnaphthyl, which was used without further purification.

Equation 3 shows the structural formula of a repeat unit of chitosan and its modification (reductive amination) to include a naphthylmethyl modifier group for use as an acid corrosion inhibitor. The base chitosan polymer used for modification in the examples below had a weight average molecular weight of 15,000 g/mol.

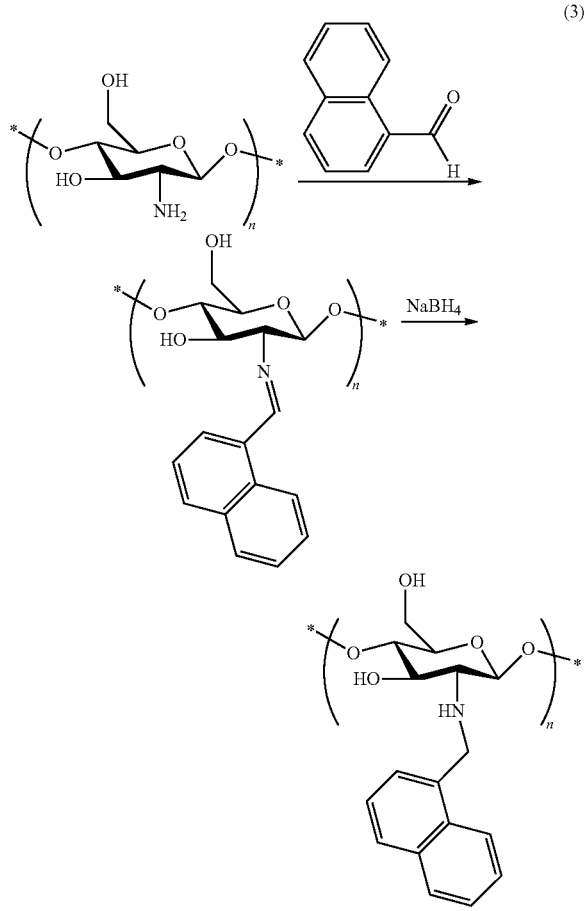

(3)

Chitosan (1 g) was dissolved in 1% acetic acid (100 ml) and a solution of naphthaldehyde (939 mg) in methanol (20 ml) added over ~10 mins. The solution was stirred for 1 hr the pH adjusted to 4.5 and a solution of sodium borohydride (343 mg) in water (3 ml) added over ~20 mins and stirred at ambient temperature for 3 hr. The pH was adjusted to 10, the solid isolated, washed with water, 1:1 ethanol:diethyl ether and dried at 60° C. to give the modified polymer which was used without further purification.

Synthesis of PEI Modified with Benzyl

PEI modified with 2-hydroxypropyl groups (330 mg) was dissolved in water and benzyl chloride (weight dependent on the degree of modification required) added and heated at 50° C. for 29 hr. The solution was extracted with ethyl acetate. The aqueous phase was purged with nitrogen and freeze dried to give PEI modified with benzyl which was used without further purification.

Various experiments were conducted in the evaluation of various polymeric acid corrosion inhibitors, in combination with various metal samples. Results of these tests are discussed below with reference to various figures. Unless otherwise stated, all RCE (dynamic) and static weight loss experiments were carried out by exposing the metal samples to 4 mol/L hydrochloric acid (HCl), with static experiments carried out in a stirred reactor.

FIG. 1 is a graph comparing the reciprocal of the resistance to corrosion ($1/R_p$) as determined by linear polarization resistance (LPR) which is directly proportional to instantaneous corrosion rate. In the tests leading to the results shown in FIG. 1, RCE tests of N80 steel samples are exposed to aqueous acidic formulations with the results plotted as a function of exposure time (at 80° C.) under dynamic conditions (1,000 rpm), to an acid formulation over time and in the presence of a monomeric acid corrosion inhibitor (e.g., naphthylmethyl quinolinium chloride (NMQCl)) and a polymeric acid corrosion inhibitor in the presence of 10 mM iodide (e.g., KI) or 1 mM CuI+9 mM KI.

Figure 2:
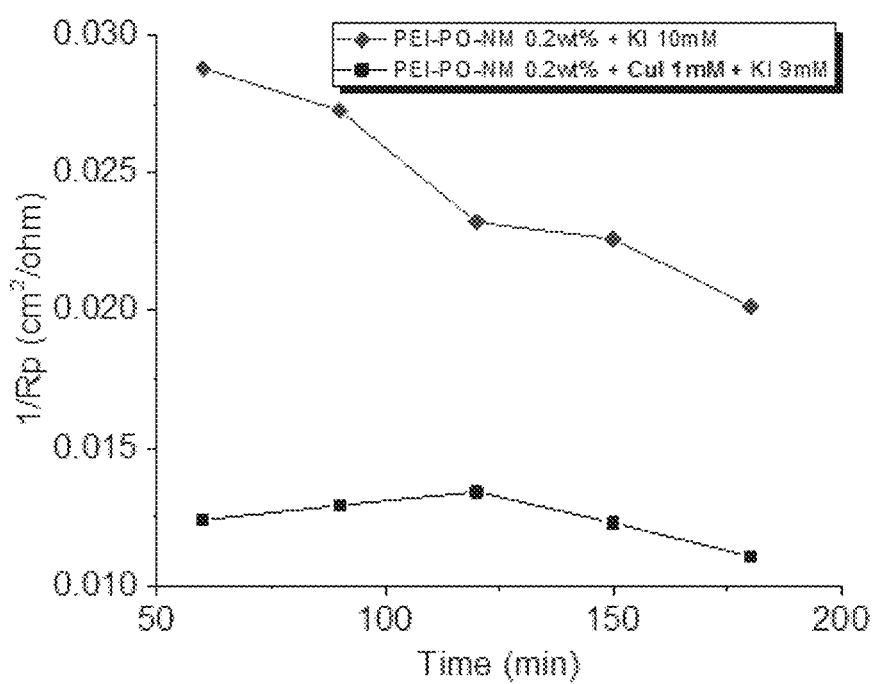
FIG. 2 is a graph showing RCE tests of steel samples exposed to aqueous acidic formulations including a polymeric corrosion inhibitor with an intensifier package including either iodide alone or iodide with copper.

FIG. 2 compares the $1/R_p$ of N80 steel samples using RCE tests at 2,000 rpm and as a function of time exposed to acid formulations at 80° C. and with 0.2 wt % of the polymeric acid corrosion inhibitor PEI modified with naphthylmethyl groups (PEI-PO-NM)) with intensifier packages containing 10 mM iodide, one without Cu (10 mM KI), and one with a copper to iodide molar ratio of 1:10 (1 mM CuI+9 mM KI).

As shown in FIG. 1, the combination of a monomeric inhibitor (NMQCl) with an intensifier package including only KI results in rapidly reaching a full inhibition efficiency. In particular, the full inhibition efficiency is reached within about 60 minutes, but this efficiency also degrades with time. With addition of CuI (intensifier package 1 mM CuI+9 mM KI), the corrosion inhibition efficiency is increased, but the trend shows that this efficiency degrades over time and persists as for the copper-free system.

With a combination of a polymeric acid corrosion inhibitor with an intensifier package including KI only, development of the full inhibition efficiency occurs more slowly as evidenced by the downward slope in FIG. 2. A combination of the polymeric acid corrosion inhibitor with the CuI+KI intensifier package provides a system which is fast acting and shows a significantly higher inhibition efficiency. With a copper-to-iodine molar ratio of 1:10, substantially full inhibition efficiency is reached within 60 mins and this full efficiency is substantially maintained over the three hours (see FIG. 2). The presence of the copper acts to reduce the initially high corrosion rate that occurs when using the polymeric acid corrosion inhibitor (ACI) with 10 mM KI. As a result, the total corrosion inhibition effect compared with the use of the polymeric ACI without a copper containing intensifier package is significant. It will be noticed comparing FIG. 1 with FIG. 2 that the actual efficiency of the monomeric ACI and polymeric ACI with KI inhibitor are similar after 60 mins, i.e. both systems achieving $1/R_p$ 0.03 cm²/ohm.

FIG. 1 further illustrates that even with dosages of polymeric ACI as low as 0.01 wt %, in the presence of the CuI intensifier, a lower overall corrosion rate (represented as the area under the respective lines) is achieved compared with using a much higher dosage (0.14 wt %) of the monomeric ACI.

Figure 3:
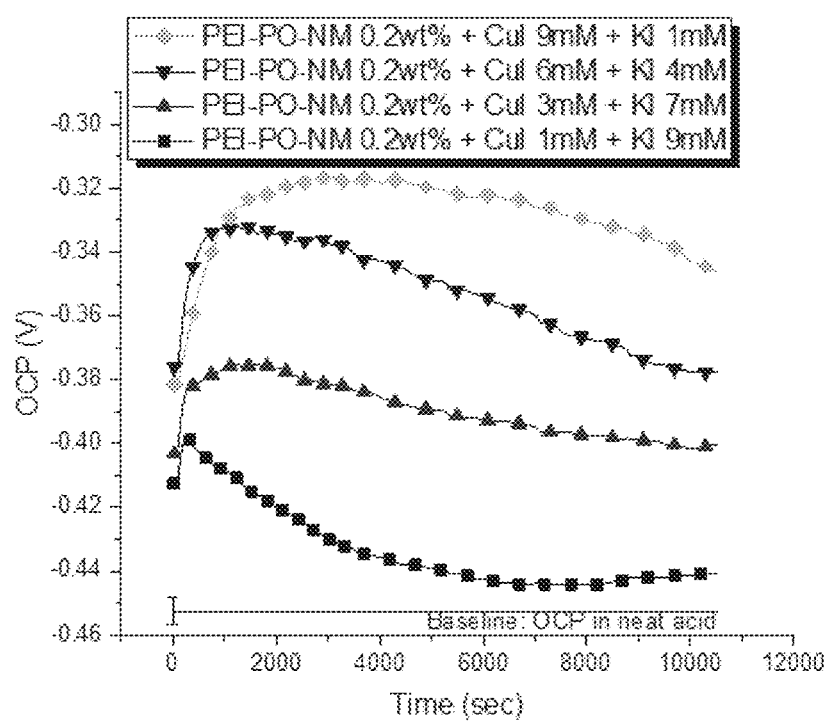
FIG. 3 is a graph derived from RCE tests showing how the open circuit potential of the surface of steel samples changes over time when in contact with an aqueous acidic formulation including polymeric corrosion inhibitor with corrosion intensifiers having differing ratios of copper to iodide and constant iodide concentration.

With reference to FIG. 3, the graph depicts results derived from an RCE test at 80° C., showing how the open circuit potential (OCP) of the surface of N80 changes over time when in contact with an aqueous acidic formulation that includes a polymeric corrosion inhibitor with corrosion intensifiers having differing ratios of copper-to-iodide, but with constant iodide concentration of 10 mM. The molar ratio shown ranges from 9:10 to 1:10.

As shown, fast acting copper ion deposition for the system including 1 mM CuI+9 mM KI results in a sharp increase in the OCP initially, while the slower acting polymeric ACI causes a subsequent slow decrease in the OCP. This may be the result of the copper and polymer co-adsorbing onto the treating surface such to provide a system that approaches ideal 'mixed' inhibition for which the corrosion rate is at a minimum. As the concentration of Cu within the intensifier package is increased, the polymeric ACI cannot compete, leading to a higher OCP "peak" and an OCP that remains higher over the three-hour exposure period of this test. In this example, the use of an intensifier package having a copper-to-iodide molar ratio of 3:10 (3 mM CuI+7 mM KI) results in an OCP which is within 15% of the baseline OCP measured for the uninhibited acid (4 mol/L HCl) within 3 hours. When the copper-to-iodide molar ratio is 1:10 (1 mM CuI+9 mM KI) an OCP within 3% of the baseline OCP is achieved within two hours.

Figures 1, 4:
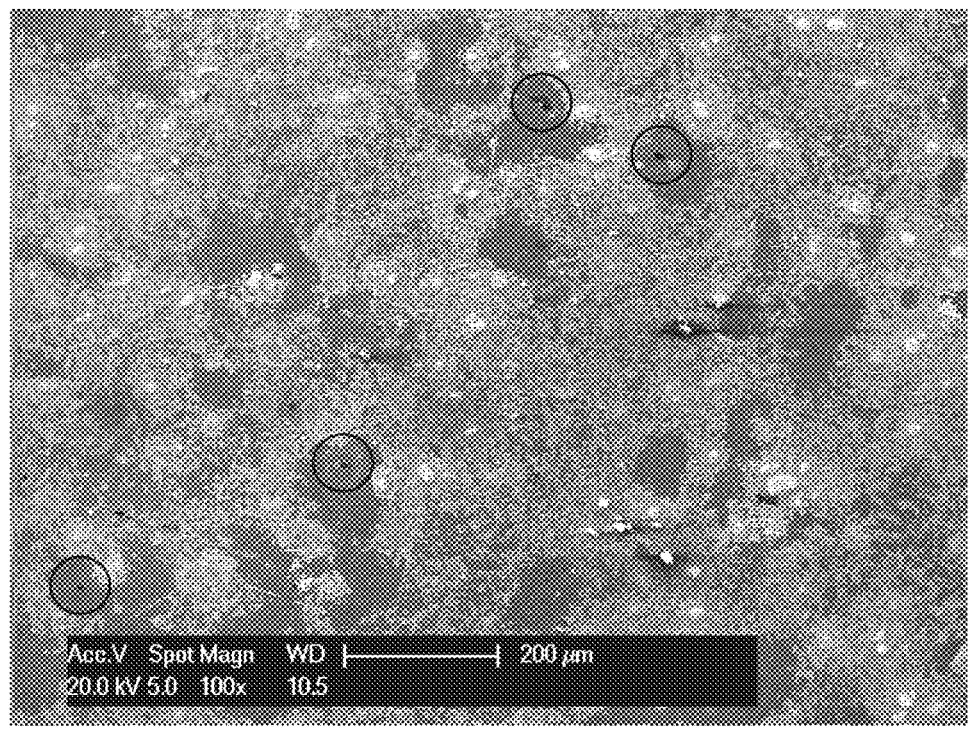
Figures 2, 4:
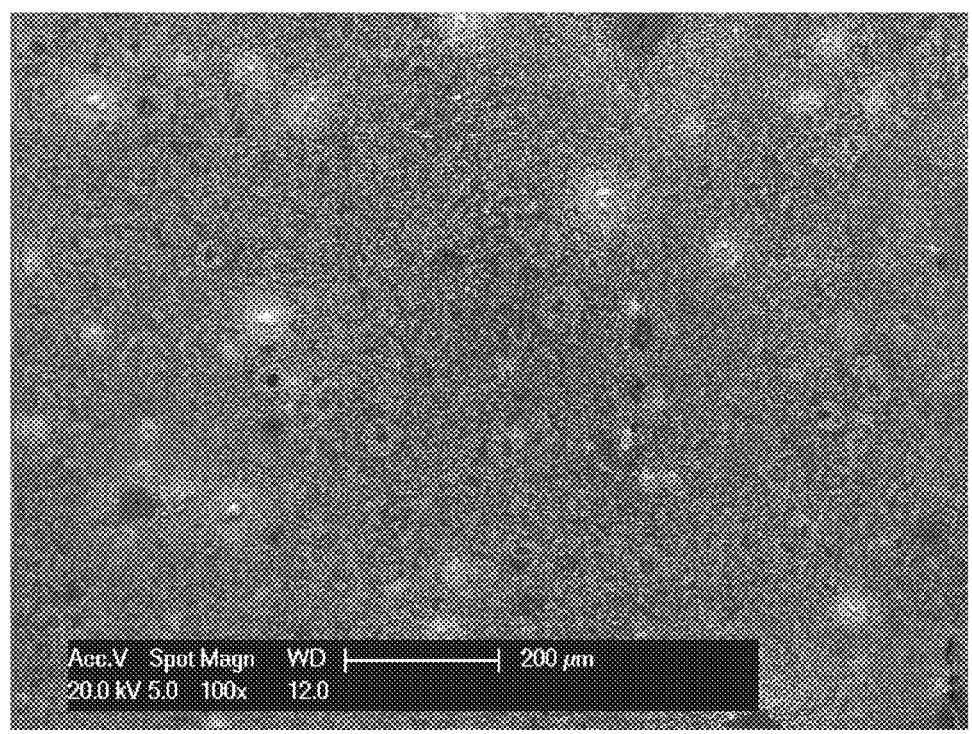

FIGS. 4-1 and 4-2 are SEM images of an N80 steel sample surface after exposure to an aqueous acidic formulation containing CUI+KI intensifier, and without (FIG. 4-1) and with (FIG. 4-2) a polymeric inhibitor. A comparison of FIGS. 4-1 and 4-2 illustrates the improved surface distribution of copper on a surface of N80 test material exposed to an acidic formulation with 4 mol/L hydrochloric acid and a combination of 0.2 wt % PVPy-NM (naphthylmethyl modified) polymeric acid corrosion inhibitor with an intensifier package including 1 mM CuI+9 mM KI, compared with the same acidic formulation but without the polymeric acid corrosion inhibitor. In each case the N80 steel surface was contacted with the acidic formulation at room temperature for 24 hours. The lighter areas represent areas with high copper concentration; the dark areas have far less or no copper. With 1 mM CuI+9 mM KI alone (FIG. 4-1), it can be seen that the copper has deposited unevenly across the surface such that it is highly concentrated in particular areas and leaving other areas with a dearth. Within the scant copper areas that sit adjacent to areas with high copper concentration, pitting, as indicated by the superimposed circles has occurred. With the combination of polymeric inhibitor and 1 mM CuI+9 mM KI intensifier, as shown in FIG. 4-2, there is a more even (less patchy) distribution of the copper across the surface as evidenced by the fewer white spots and fewer dark areas. FIGS. 4-1 and 4-2 suggest that the polymeric ACI acts to regulate both the quantity and distribution of copper deposited on the metal surface.

Figure 5:
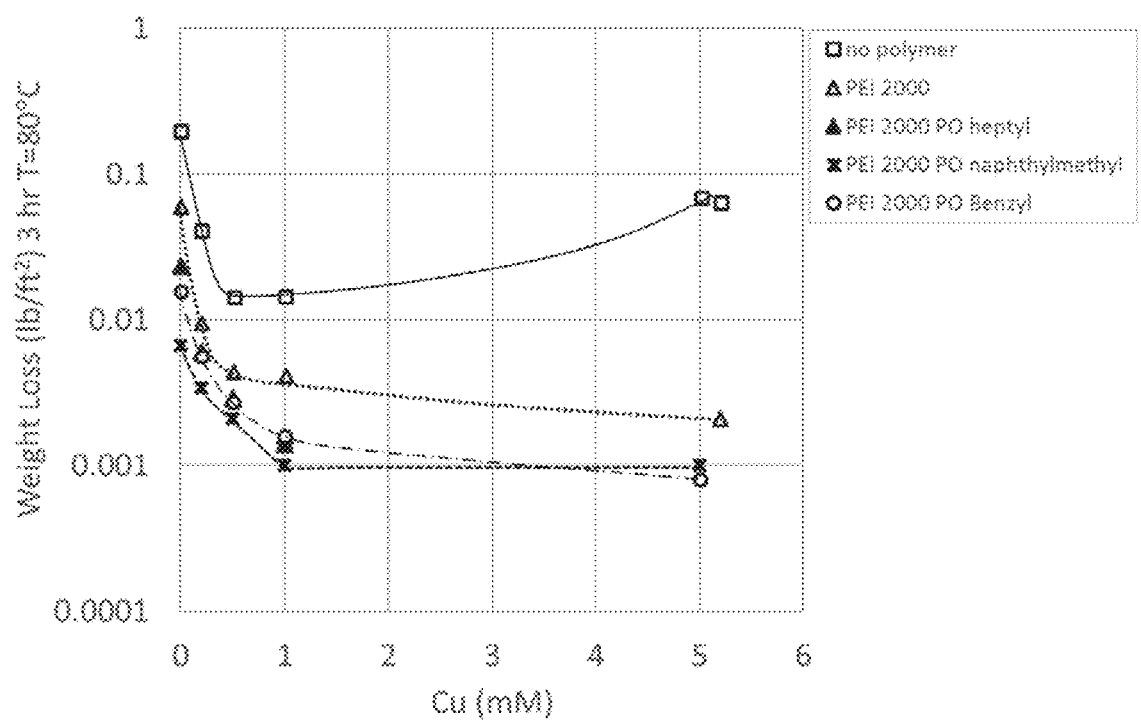
FIG. 5 is a plot of cumulative weight loss measurements of steel samples exposed to aqueous acidic formulations with various polymeric acid corrosion inhibitors, each tested with various intensifier packages at increasing concentrations of Cu and a constant iodide concentration, along with a sample without the corrosion inhibitor.

FIG. 5 illustrates cumulative weight loss of HS80 steel samples exposed to 4 mol/L HCl for 3 hours at 80° C. in the presence of variously modified forms of PEI polymeric acid corrosion inhibitor, and intensifier packages each including 10 mM iodide but with varying concentration of copper ions such as to vary the molar ratio of copper to iodide. Where no polymeric ACI is present, the presence of low levels of copper has a beneficial effect on corrosion inhibition (relative to 10 mM KI) but increased concentrations of copper, i.e. above 0.5-1.0 mM, are detrimental. This increased corrosion rate is attributed to a galvanic effect, due to excessive and heterogeneous deposition of copper on the treated surface. In the presence of the polymeric ACIs, a dramatic improvement in corrosion inhibition is observed with copper ion concentrations below 1 mM providing a corrosion rate of about 0.001-0.005 lb/ft$^2$ (0.024 kg/m$^2$) over three hours. This benefit is maintained up to at least concentrations of 5 mM Cu, suggesting no or little galvanic corrosion is occurring even in the presence of such high concentrations of copper. This is evidence that the presence of the polymer ACI regulates copper electro-deposition, leading to significantly lower corrosion rates and a lower sensitivity to 'overdosing' of copper (cathodic inhibitor). Also, referring to the FIG. 5, data pertaining to the intensifier package 1 mM CuI+9 mM KI, it is clear that modification of the PEI improves inhibition performance, the lowest rate being achieved by modification with naphthylmethyl groups.

Figure 6:
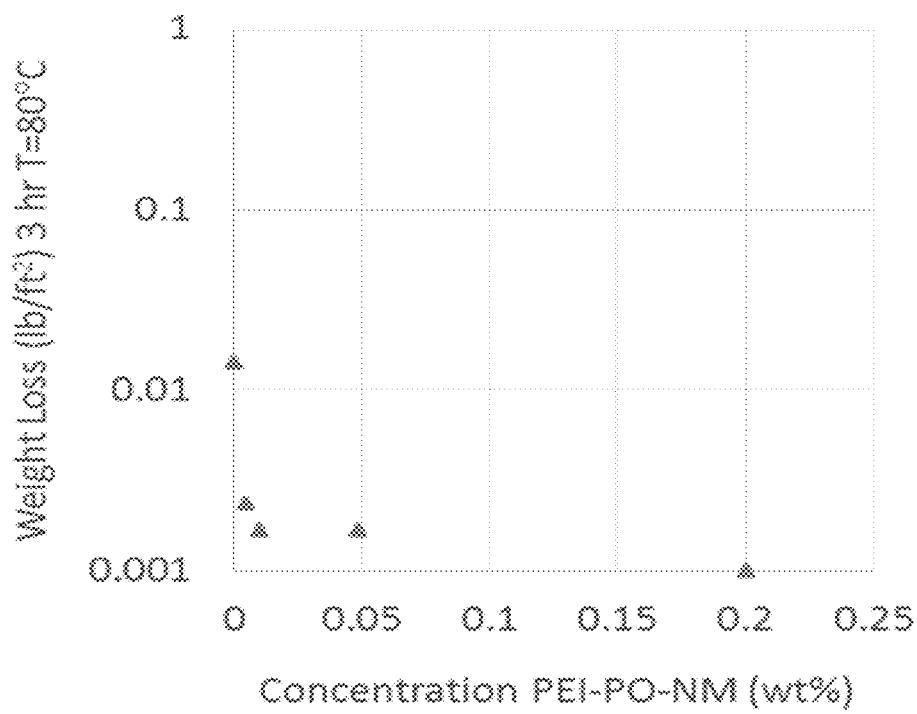
FIG. 6 is a plot of cumulative weight loss measurement of steel samples exposed to aqueous acidic formulations including a naphthylmethyl modified PEI polymer acid corrosion inhibitor present at various concentrations, with an intensifier package including CuI and KI at a copper-to-iodide molar ratio of 1:10.

FIG. 6 illustrates the cumulative weight loss of HS80 samples exposed at 80° C. to acid formulations having varying concentrations (0.01-0.2 wt %) of modified PEI (PEI-PO-NM) in the presence of an intensifier package comprising 1 mM CuI+9 mM KI, and in which the intensifier package includes 1 mM CuI and 9 mM KI (copper-to-iodide molar ratio of 1:10). The inclusion of only 0.01 wt % (100 ppm) to 0.05 wt % (500 ppm) polymeric ACI was enough in this example to provide sufficient corrosion inhibition for many downhole applications. With the inclusion of 0.2 wt % polymeric ACI, the 3-hour cumulative weight loss was approximately 0.001 lb/ft$^2$ (0.005 kg/m$^2$).

Figure 7:
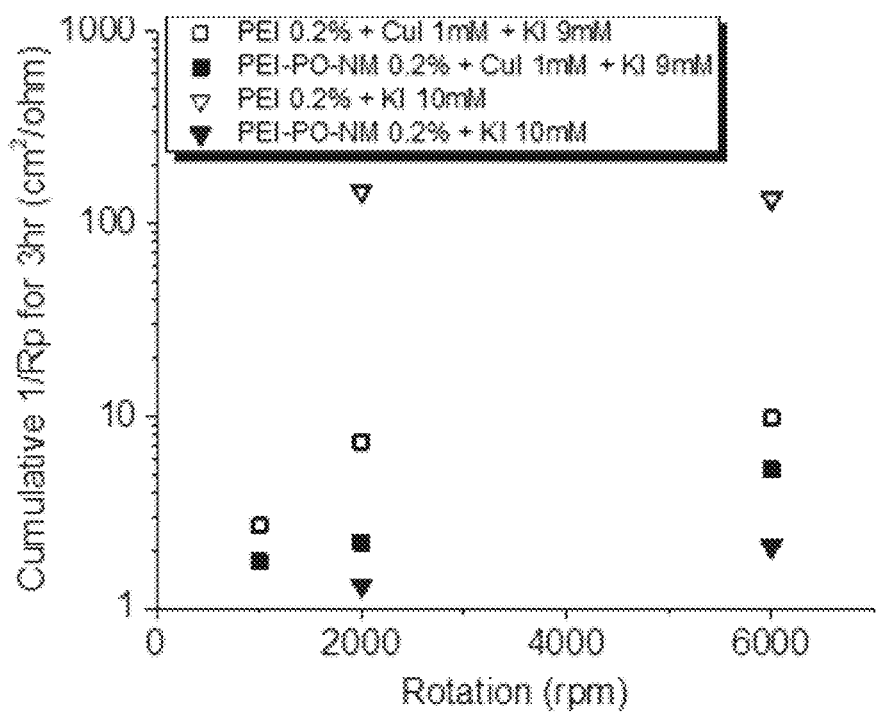
FIG. 7 is a plot of cumulative ($1/R_p$) RCE results of steel samples exposed to various aqueous acid formulations under varying dynamic conditions, and with formulations containing polymeric acid corrosion inhibitor PEI or PEI-NM each in the presence of KI or CuI+KI.

FIG. 7 illustrates that more complex behavior is observed under dynamic flow conditions. FIG. 7 compares cumulative $1/R_p$ of HS80 steel samples exposed over 3 hours, as a function of rotation speed (1,000 to 6,000 rpm RCE) for the test samples exposed to acidic formulations having different polymeric ACIs present at 0.2 wt %, and all with a 10 mM concentration of iodide. The formulations contain 0.2 wt % polymeric acid corrosion inhibitor PEI or PEI-NM, each in the presence of 10 mM KI or 1 mM CuI+9 mM KI. For unmodified PEI, it is evident that the presence of Cu provides significant reduction of corrosion rate. PEI modified with napthyl methyl with or without a copper intensifier shows still better corrosion inhibition, and the presence of Cu has a relatively subtle effect.

Figure 8:
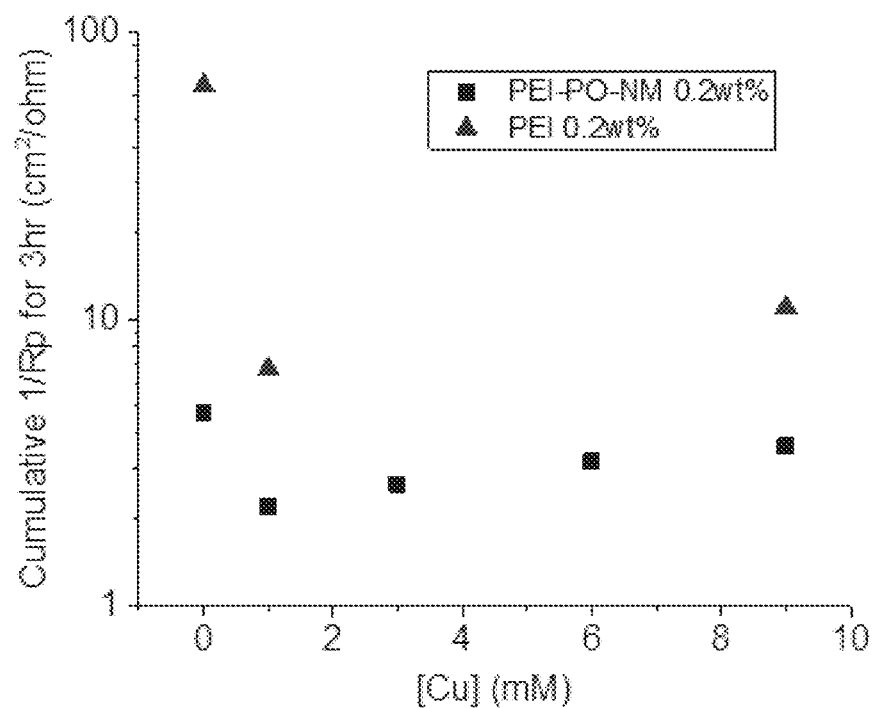
FIG. 8 is a graph showing cumulative ($1/R_p$) RCE (2000 rpm) results (80° C.) of N80 samples exposed for 3 hours, comparing the efficiency of naphthylmethyl modified PEI and unmodified PEI polymeric acid corrosion inhibitors in the presence of 10 mM KI ([Cu]=0) and CuI+KI mixtures with increasing Cu content and constant iodide (10 mM)

FIG. 8 illustrates cumulative ($1/R_p$) RCE tests at 2,000 RPM, for N80 samples over 3 hours, in the presence of the unmodified and modified PEI inhibitors (0.2 wt %) with intensifier packages including CuI and KI, where there is a constant concentration of iodide (10 mM) and varying amounts of copper. In particular, modified PEI and unmodified PEI polymeric acid corrosion inhibitors include KI without Cu, and CuI+KI mixtures of increasing Cu content and constant iodide. It can be seen in this test that the modified PEI provides improves corrosion inhibition relative to the unmodified PEI.

Figure 9:
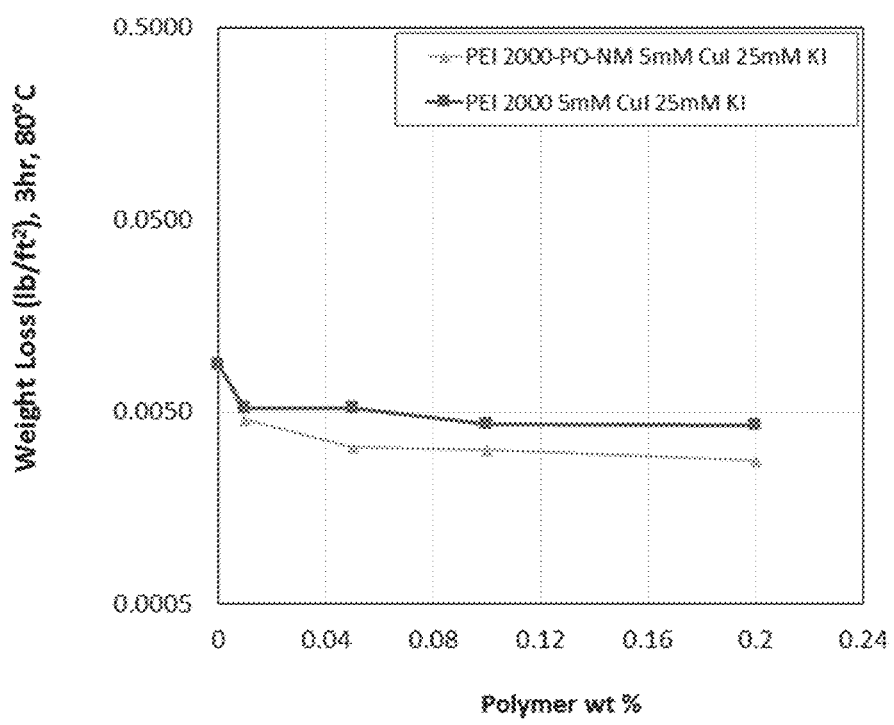
FIG. 9 is a graph showing cumulative weight loss of steel samples in the presence of various aqueous acidic formulations that compare the efficiency of naphthylmethyl modified PEI and unmodified PEI polymer acid corrosion inhibitors in the presence of CuI+KI intensifier, and as a function of the polymeric acid corrosion inhibitor concentration.

FIG. 9 illustrates the effect of polymer dosage when using duplex stainless steel (DSS) 2205 samples, and the results of cumulative weight loss (3 hours, 80° C.). The plot shows the effect of an unmodified PEI ACI compared with a naphthylmethyl modified PEI, both in the presence of a 5 mM CuI+25 mM KI intensifier package on corrosion inhibition of DSS 2205 as a function of polymeric ACI concentration. It can be seen that the modified polymer provides improved corrosion inhibition, and that the improvement generally increases with increased polymer wt % (particularly at about 0.05 wt %). This may be due to the more noble surface of DSS resulting in a lower driving force for copper ion electro-deposition relative to HS80 or N80 steels. As such, a greater overall concentration of iodide in the formulation may prove beneficial. Again, the results suggest the inclusion of as little as 0.01 wt % (100 ppm) polymeric ACI provides a visibly significant increase in inhibition efficiency.

Figures 1, 10:
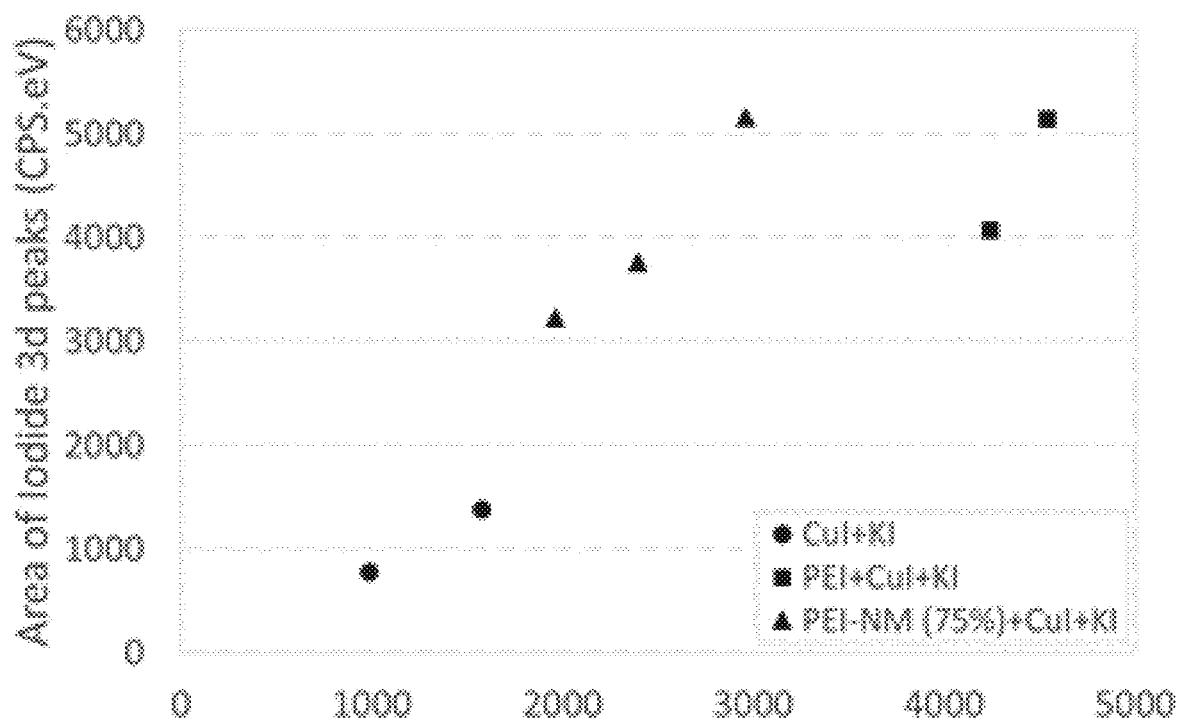
Figures 2, 10:
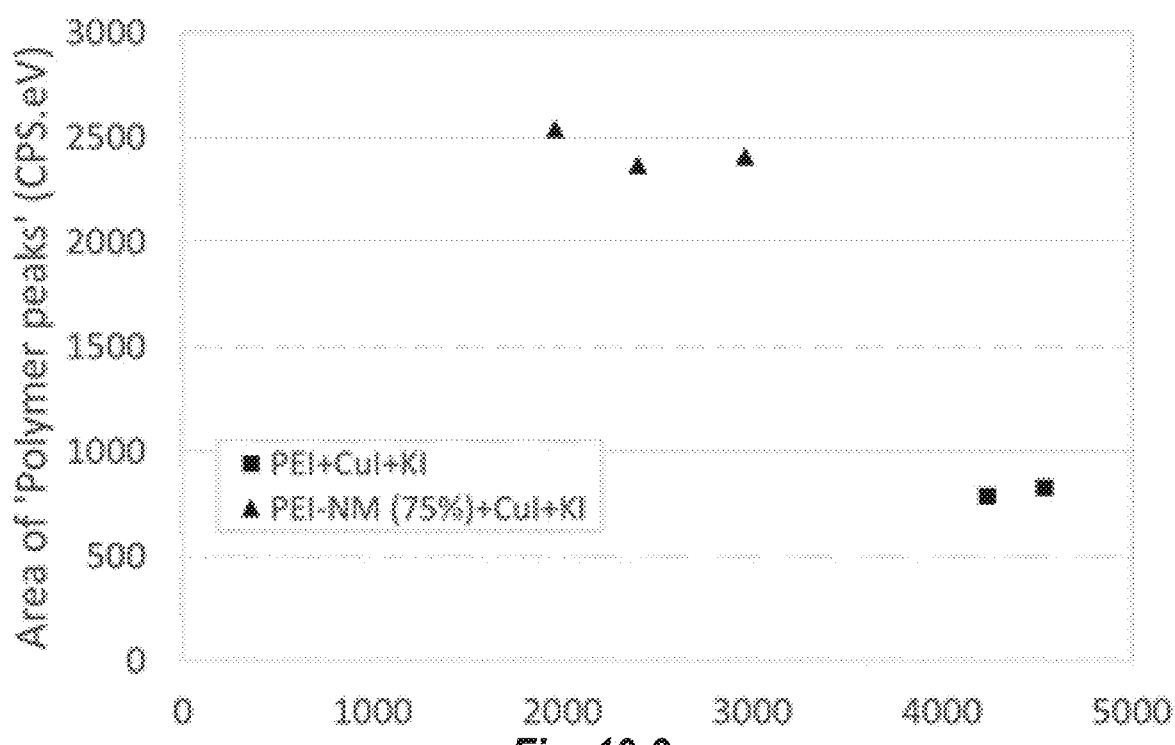

FIGS. 10-1 and 10-2 are results derived from X-ray photoelectron spectroscopy (XPS) analysis of the surfaces of DSS 2205 samples used in the 0.2 wt % polymer tests shown in FIG. 9 (1 mM CuI+9 mM KI), and indicate the degree of copper and iodide adsorption on the samples. A control without the polymeric acid corrosion inhibitor is also shown in FIG. 10-1. It can be seen from these results that the presence of a polymeric ACI increases the adsorption of copper and iodide to the surface of DSS 2205 compared to when no polymeric ACI is present, and that PEI modified with naphthylmethyl leads to increased adsorption of polymer (but not of copper or iodide) relative to unmodified PEI. This contrasts with that observed for HS80 (see FIG. 15), in which the presence of PEI decreases the amount of copper adsorbed onto the surface. Such data suggests that the polymeric ACI has a regulating effect; acting to increase the adsorption of copper ions onto more noble surfaces like DSS 2205, which may facilitate initial corrosion protection through fast acting copper deposition, but slowing or homogenizing the distribution of copper onto less noble surfaces such as HS80 (and in which $Cu^+$ is more strongly drawn), each to retard galvanic corrosion. It should be noted that the 'polymer peaks' results are given by analysis of nitrogen 1 s peaks with correction for the fact that unmodified and modified polymers have different nitrogen contents.

Figure 11:
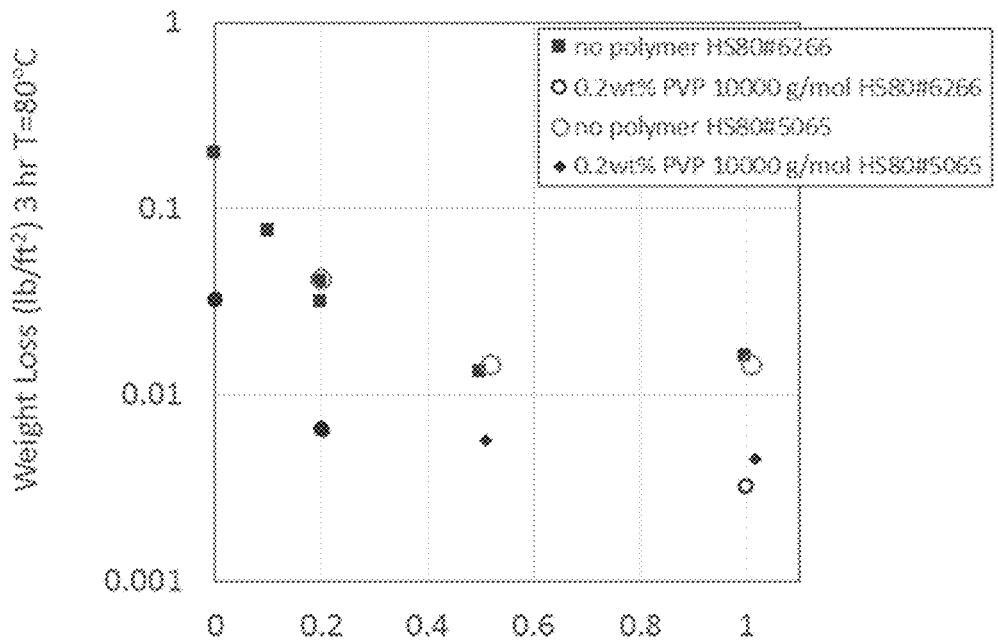
FIG. 11 is a plot showing cumulative weight loss of different steel samples exposed to aqueous acidic formulations each containing iodide, various concentrations of copper, and polyvinylpyrrolidone (PVP) polymeric acid corrosion inhibitor, along with controls in the absence of the polymeric acid corrosion inhibitor.

FIG. 11 illustrates, through cumulative weight loss experiments (3 hours, 80° C.), the corrosion inhibition effect of a different polymeric inhibitor, polyvinylpyrrolidone (PVP), with CuI+KI intensifier packages on HS80 steel samples as a function of the copper concentration. All experiments used constant iodide concentration of 10 mM. IN this experiment, two different batches of samples were exposed to the aqueous acidic formulations. The experiments evidence the benefit of a combination of PVP with CuI+KI intensifier over the KI intensifier alone. When the copper-to-iodide molar ratio is 1:20, the weight loss is reduced by a factor≈10 (no polymer) and by a factor≈5 when PVP is present, relative to the copper-free systems (10 mM KI).

Figure 12:
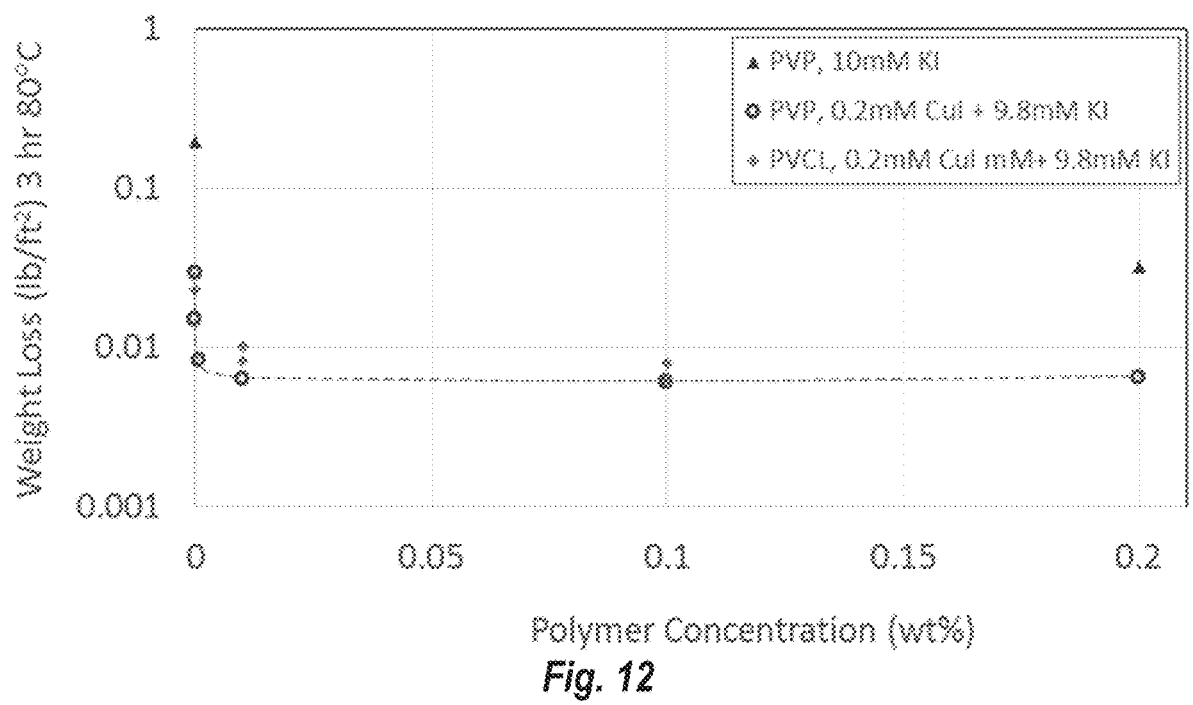
FIG. 12 is a plot showing cumulative weight loss of steel samples exposed to aqueous acidic formulations containing various concentrations of PVP or polyvinylcaprolactam (PVCL) with an intensifier package including CuI+KI at a molar copper to iodide ratio of 1:50, along with some control data for formulations which do not contain copper.

FIG. 12 is a chart showing cumulative weight loss over 3 hours at 80° C. for HS80 steel samples exposed to aqueous acidic formulations having 0.01-0.2 wt % concentrations of PVP or PVCL, and illustrates the corrosion inhibition efficiency of PVP and PVCL ACIs with a 0.2 mM CuI+9.8 mM KI intensifier package as a function of concentration of polymeric ACI. It can be seen that significant corrosion inhibition effects can be obtained with the addition of as little as 0.01 wt % (100 ppm) polymeric ACI. It is also notable that significantly enhanced corrosion inhibition is given by using this intensifier package with a copper-to-iodide molar ratio of 1:50, relative to copper-free systems.

Figures 1, 13:
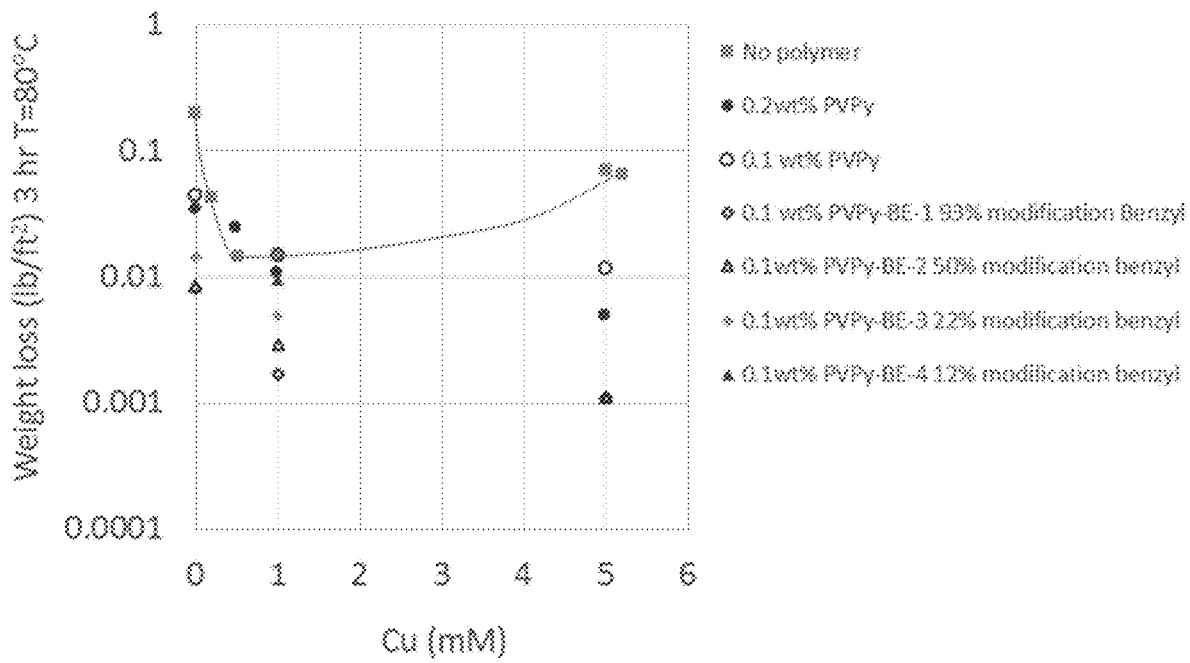
Figures 2, 13:
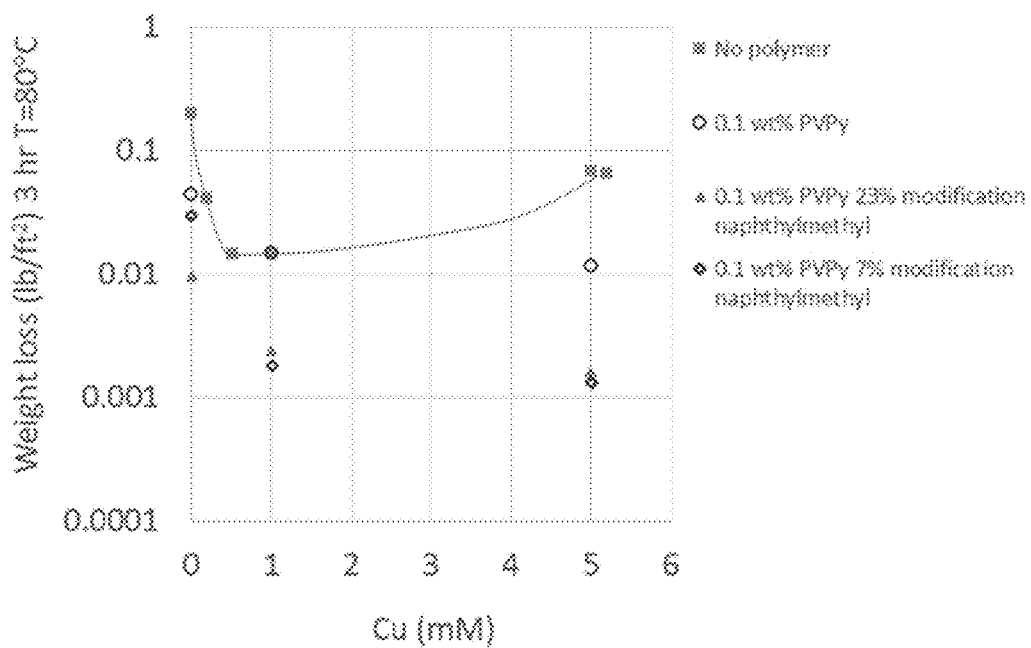

FIG. 13-1 illustrates that with an intensifier package of 10 mM KI (no copper) or 1 mM CuI+9 mM KI on HS80 steel samples over 30 hours at 80° C., excellent corrosion inhibition is given by increased modification of PVPy with benzyl groups. At any given Cu concentration in the range 0-5 mM (all tests at constant iodide 10 mM using 10 mM KI, 1 mM CuI+9 mM KI, and 5 mM CuI+5 mM KI), we observe that an increase in the degree of benzyl modification reduces corrosion rate.

FIG. 13-2 is a graph of similar cumulative weight loss shows there is a similar trend with increased modification of PVPy with naphthylmethyl groups.

Figures 1, 14:
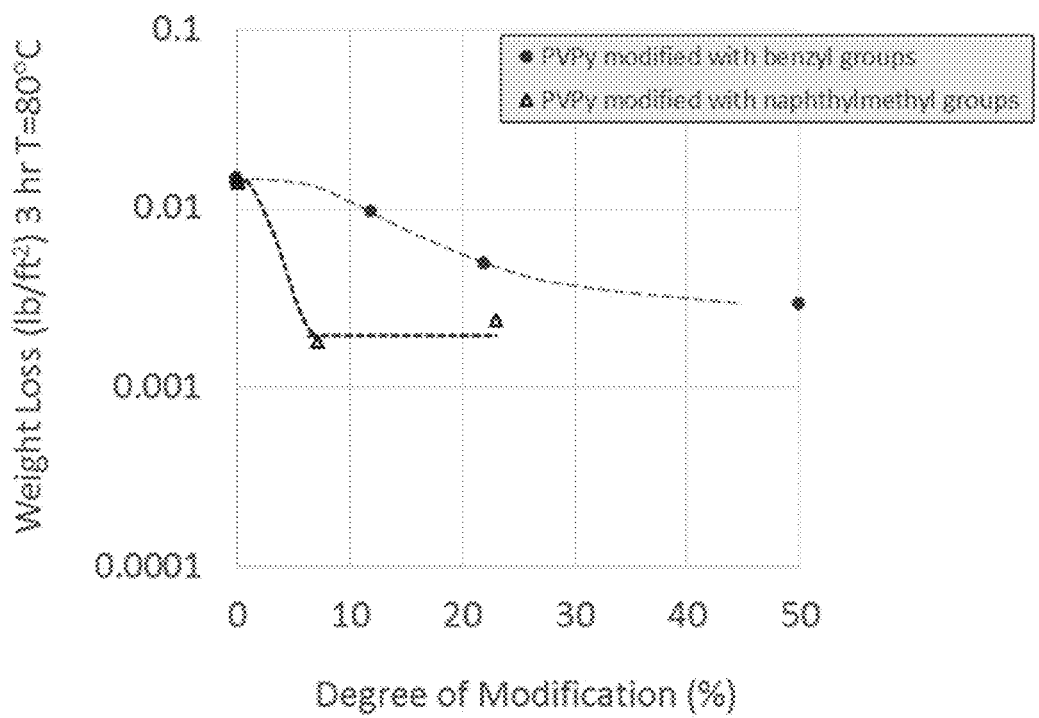
Figures 2, 14:
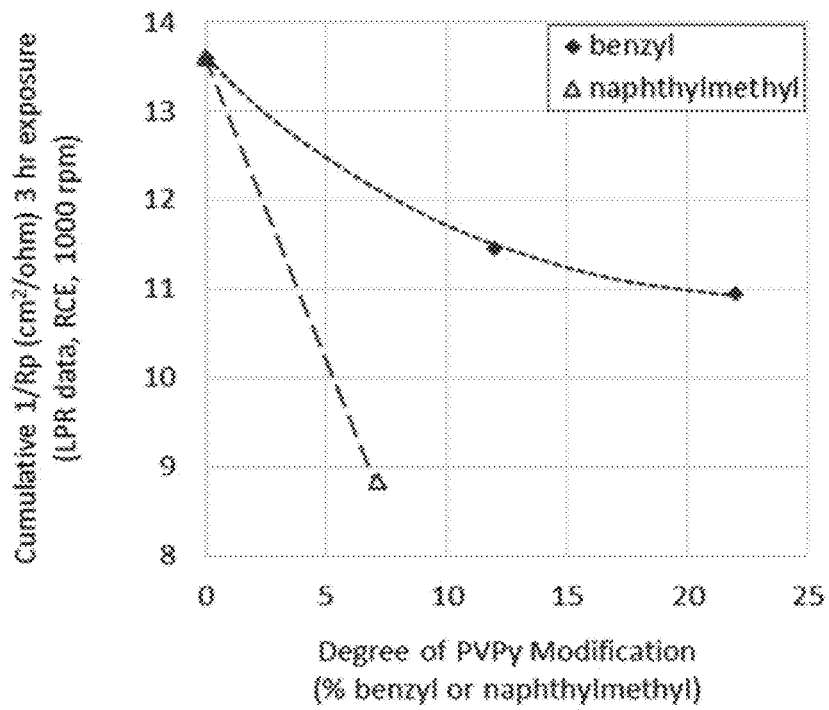

This is further evidenced by the plots of FIGS. 14-1 and 14-2 that illustrate cumulative weight loss of HS80 (FIG. 14-1) and cumulative ($1/R_p$) (RCE 1,000 rpm) of N80 (FIG. 14-2) in the presence of a 1 mM CuI and 9 mM KI (copper-to-iodide molar ratio of 1:10) intensifier package with PVPy polymer inhibitors modified to different degrees with either benzyl or naphthylmethyl groups. An ACI comprising a polymer modified to a greater degree appears in general to improve corrosion inhibition efficiency, but the degree of the effect is dependent on the metal type. In addition, for both metal types in this test, for a given degree of modification in the range up to 25 mol %, naphthylmethyl groups improve inhibition efficiency to a greater extent than benzyl groups.

Figures 1, 15:
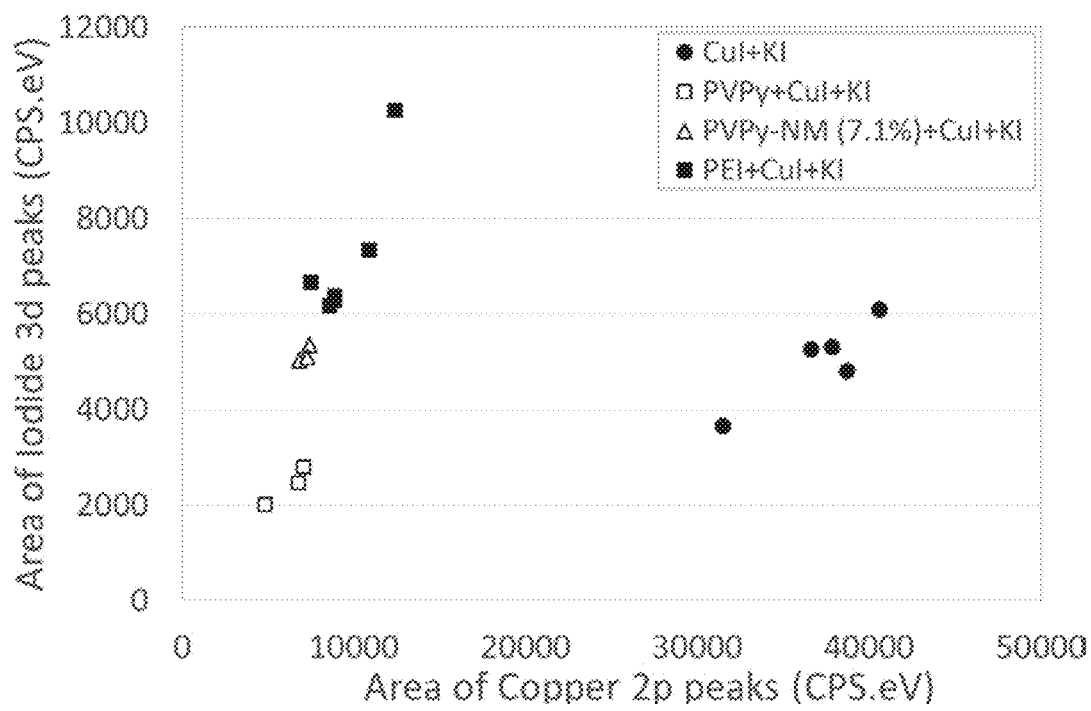
Figures 2, 15:
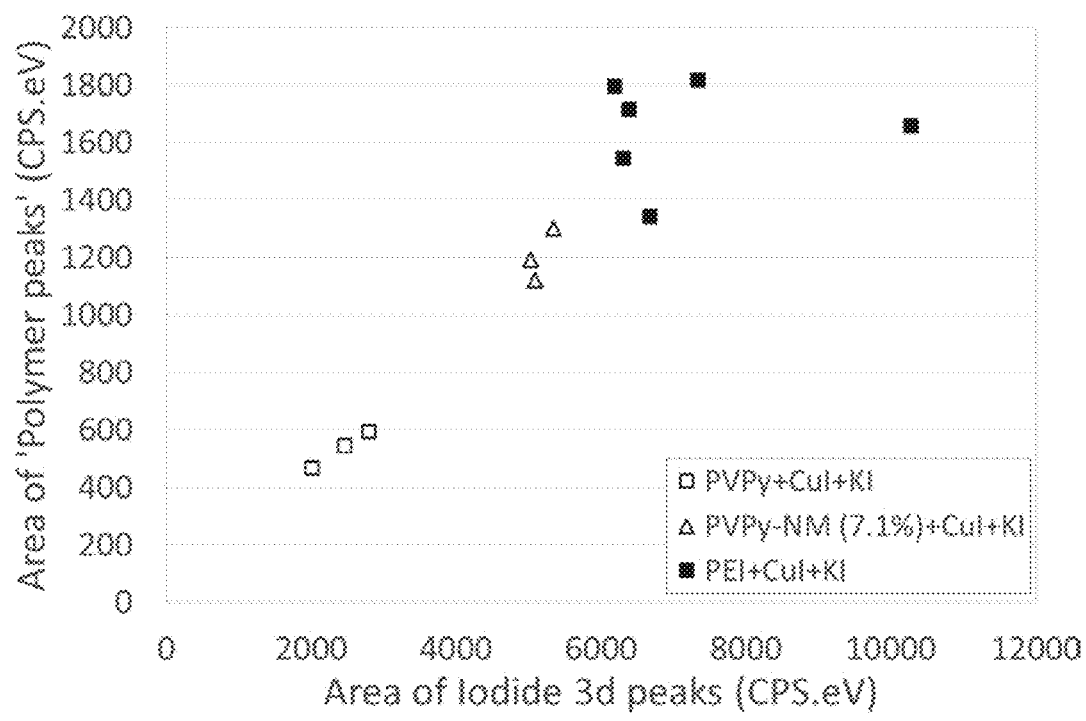

FIGS. 15-1 and 15-2 are charts derived from XPS analysis of the surface of HS80 steel samples showing the degree of iodide and copper (FIG. 15-1) and polymer (FIG. 15-2) adsorption on the samples exposed to the aqueous acidic solutions. FIGS. 15-1 and 15-2 compare species adsorbed following exposure to acidic fluids comprising a 1 mM CuI and 9 mM KI intensifier package with modified (7.1 mol %) and unmodified polymeric ACIs. For HS80, the presence of a polymeric ACI reduces the degree to which copper is adsorbed to the surface; the degree of polymer adsorption follows order: PEI>PVPy-NM>PVPy; and the area of the copper and iodide XPS peaks increases with increased polymer adsorption, suggesting co-adsorption of the polymer and copper and iodide.

Other Polymeric ACIs

Figure 16:
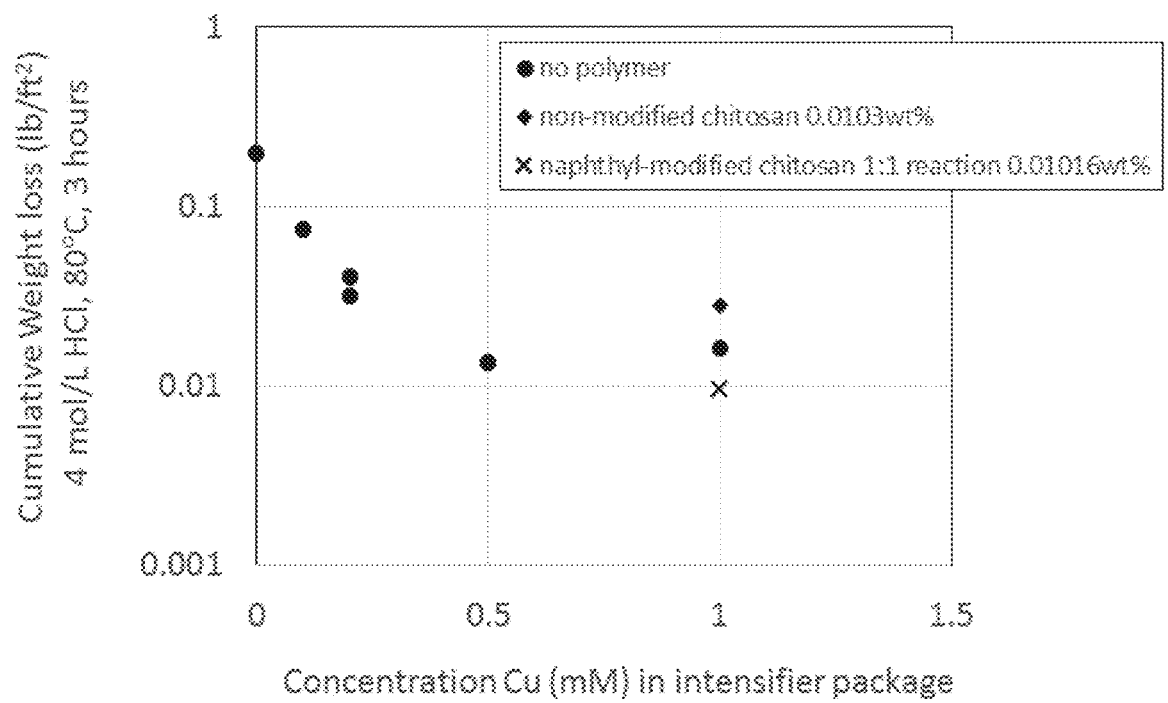
FIG. 16 is plot showing cumulative weight loss of steel samples exposed to various aqueous acidic solutions including various chitosan polymeric acid corrosion inhibitors either unmodified or modified methylnaphthyl groups as a function of the concentration of polymeric acid corrosion inhibitor and in the presence of CuI and KI at a copper-to-iodide molar ratio of 1:10.

FIG. 16 compares cumulative weight loss experiments of HS80 test samples with chitosan polymeric ACIs (unmodified and modified methylnaphthyl groups) in the presence of an intensifier including 1 mM CuI+9 mM KI (copper-to-iodide molar ratio of 1:10) over 3 hours at 80° C. Naphthylmethyl modification reduces the weight loss relative to unmodified chitosan in the presence of 1 mM CuI and 9 mM KI.

Figure 17:
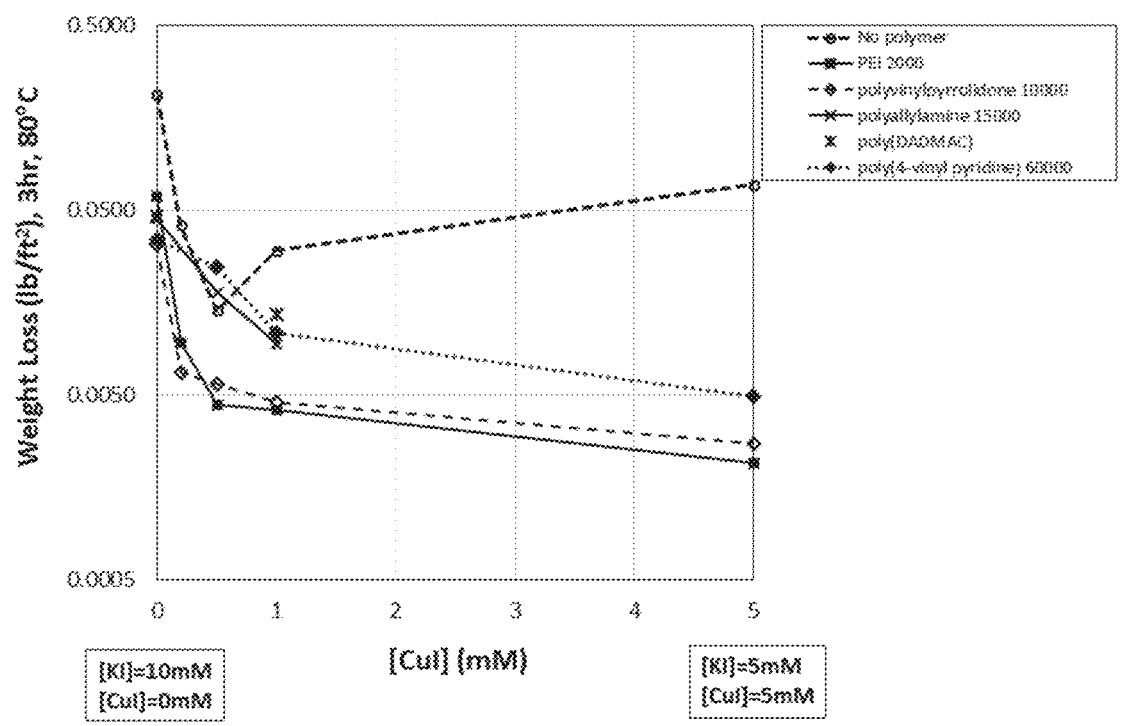
FIG. 17 is a chart showing cumulative weight loss of steel samples exposed to various acidic aqueous solutions having different polymeric acid corrosion inhibitors—namely PVP, polyallylamine, poly(diallyldimethylammonium chloride) (poly(DADMAC)), and PVPy—tested with a corrosion inhibition intensifier including KI without copper, and several CuI+KI mixtures with increasing copper concentrations, along with control data for comparison.

FIG. 17 illustrates cumulative weight loss of HS80 steel exposed (3 hours; 80° C.) in the presence of various polymeric ACIs, with intensifier packages containing 10 mM iodide without copper and with increasing concentrations of copper (added as CuI in concentrations for 0.2 mM to 5 mM). Each ACI is present at 0.2 wt %/The performance of poly(DADMAC) & poly(allylamine) are similar to non-modified PVPy. By comparison, superior performance is given by polyvinylpyrrolidone (PVP) and non-modified PEI. As shown earlier, PVP shows good performance with 0.2 mM (38 ppm) CuI+9.8 mM KI (the Cu dosage in this intensifier package is 12.7 ppm).

Ag Oxide Intensifier

Figure 18:
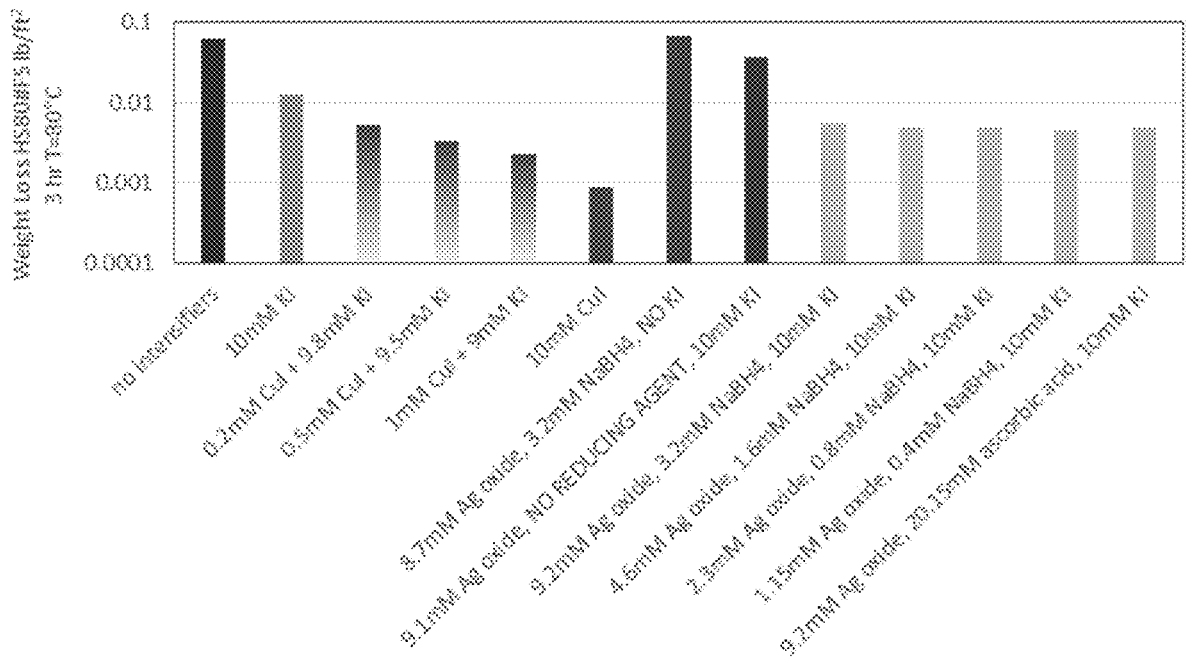
FIG. 18 is a chart showing cumulative weight loss of steel samples exposed to various aqueous acidic solutions each including polyvinylpyrrolidone (PVP) and an intensifier package having a KI or CuI+KI mixture, or a silver oxide with various reducing agents.

FIG. 18 compares cumulative weight loss results (3 hour, 80° C.) for several HS80 samples contacted with test aqueous acidic solutions that include a 0.2 wt % PVP (10,000 g/mol) ACI. The control contains no intensifiers (WL=0.0625 $lb/ft^2$ (0.305 $kg/m^2$)). The KI/CuI intensifier mixtures are either 10 mM KI or CuI+KI mixtures containing 10 mM iodide, or silver oxide with various reducing agents, and the mixtures show the beneficial effect of increasing copper concentration (added as CuI) at constant iodide (10 mM). The acidic fluids (4 mol/L HCl) including silver oxide show the beneficial effect of using a combination of silver oxide and reducing agent, in the presence of 10 mM KI, to reduce the corrosion rate relative to 10 mM KI alone. The concentrations of silver oxide and sodium borohydride can be reduced to 1.15 mM and 0.4 mM, respectively (WL=0.0045 $lb/ft^2$ (0.022 $kg/m^2$)); however, in this test this system is not effective in the absence of iodide (WL=0.0665 $lb/ft^2$ (0.325 $kg/m^2$)) and it is only weakly effective in the absence of a reducing agent (WL=0.0353 $lb/ft^2$ (0.172 $kg/m^2$).

Bismuth Intensifier

Figure 19:
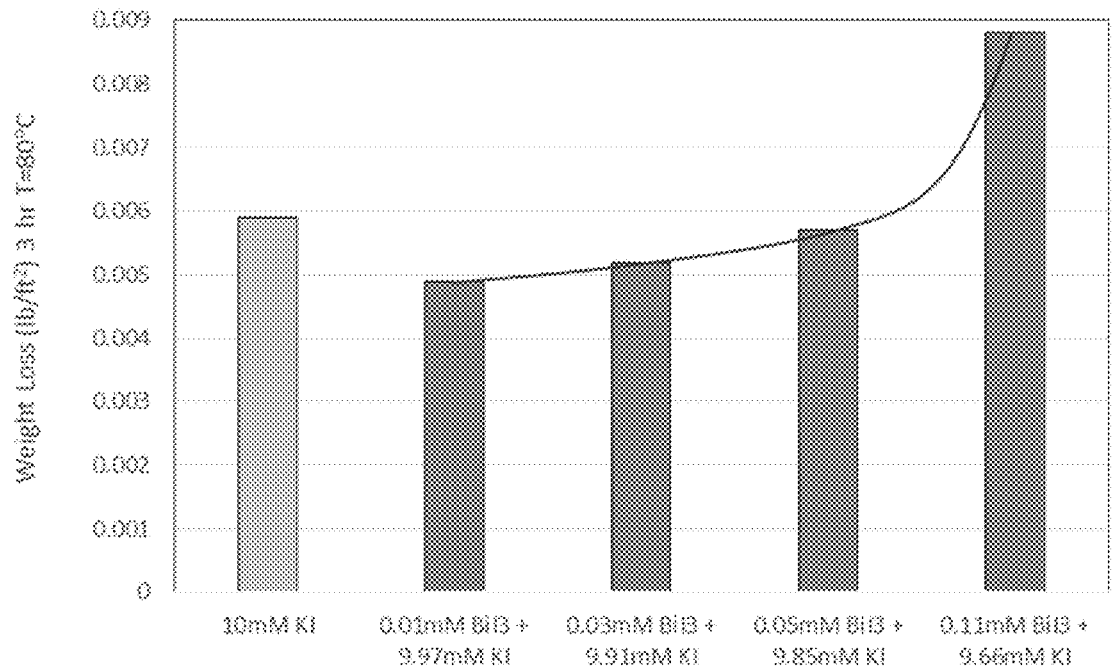
FIG. 19 is a chart showing cumulative weight loss of steel samples exposed to various aqueous acidic solutions including naphthylmethyl-modified PEI (PEI-PO-NM) and an intensifier package that is either KI or $BiI_3$+KI mixtures, with increasing bismuth content.

FIG. 19 shows cumulative weight loss over 3 hours at 80° C. of HS80 steel samples exposed to various aqueous acidic solutions including 0.2 wt % PEI-PO-NM, with an intensifier package that is either 10 mM KI or $BiI_3$+KI mixtures containing 10 mM iodide, with increasing bismuth content (from 0.01 to 0.11 mM). This chart illustrates that in combination with 0.2 wt % PEI-PO-NM polymeric acid corrosion inhibitor and 10 mM iodide, low concentrations of $BiI_3$ (0.01-0.05 mM) reduce the corrosion rate relative to 10 mM KI alone. The fluids containing 0.01-0.05 mM $BiI_3$ have bismuth-to-iodide molar ratios in the range 1:200 to 1:1000.

CuCl & $CuCl_2$ Intensifier

Figure 20:
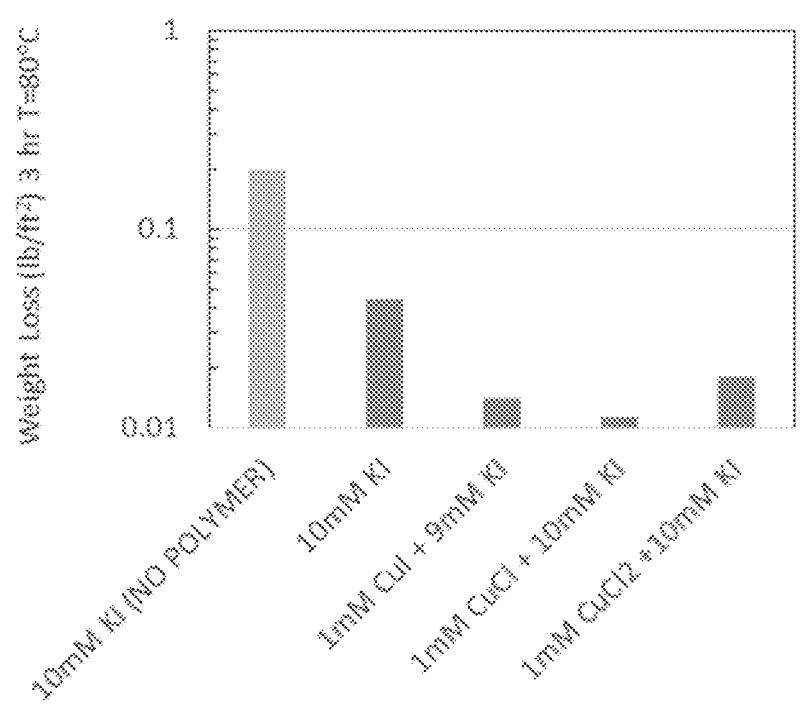
FIG. 20 is a chart showing cumulative weight loss of steel samples exposed to various aqueous acidic solutions including PVPy with an intensifier package including either KI, CuI+KI, CuCl+KI, or $CuCl_2$+KI, along with a control for comparison.

The chart of FIG. 20 illustrates cumulative weight loss experiments of HS80 steel samples exposed (3 hours; 80° C.) to various aqueous acidic solutions including 0.1 wt % PVPy, 1 mM CuI+9 mM KI, 1 mM CuCl+10 mM KI, or 1 mM CuCl$_2$+10 mM KI. The chart evidences that an intensifier package including 10 mM KI, in combination with a 0.1 wt % PVPy polymeric acid inhibitor CuI, CuCl, and CuCl$_2$ copper salts are effective (at 1 mM Cu) in combination with a total iodide concentration of 10 mM. This demonstrates that each of copper(I) iodide, copper(I)chloride and copper(II) chloride provide effective copper sources for the acid corrosion intensifier.

Matrix Acidizing

In the process of matrix acidizing, a producing formation is treated with acid to stimulate production. The process involves exposure of wellbore steel(s) to the acid. This operation may be performed with coiled tubing, which is run into the wellbore and then used to convey the matrix acidizing fluid down the tubing to the region where it enters the rock formation. When the matrix acidizing fluid injection period comes to an end, the wellbore casing and the exterior of the coiled tubing can be further exposed to overflush fluids and so-called "unspent" acid flowing back with formation fluids. Protection of the tubing and wellbore steel(s) can be achieved through adding to the acid before contact with the steel(s), a polymeric acid corrosion inhibitor and a corrosion inhibitor intensifier package comprising iodide salt(s) and metal salt(s).

FIG. schematically illustrates positioning of coiled tubing for a matrix acidizing operation. Flow from the wellbore is halted by closing valve(s) at the wellhead. Coiled tubing 12 is drawn off from a reel 14 and taken over a guide 16 which turns the tubing to descend vertically into a wellbore. The tubing 12 is lowered into the wellbore through well control equipment 18 until the downhole end of the tubing reaches perforations 22 which give access to the formation outside the well casing. The well control equipment 18 includes one or more valves able to prevent flow from the wellbore.

Figure 21:
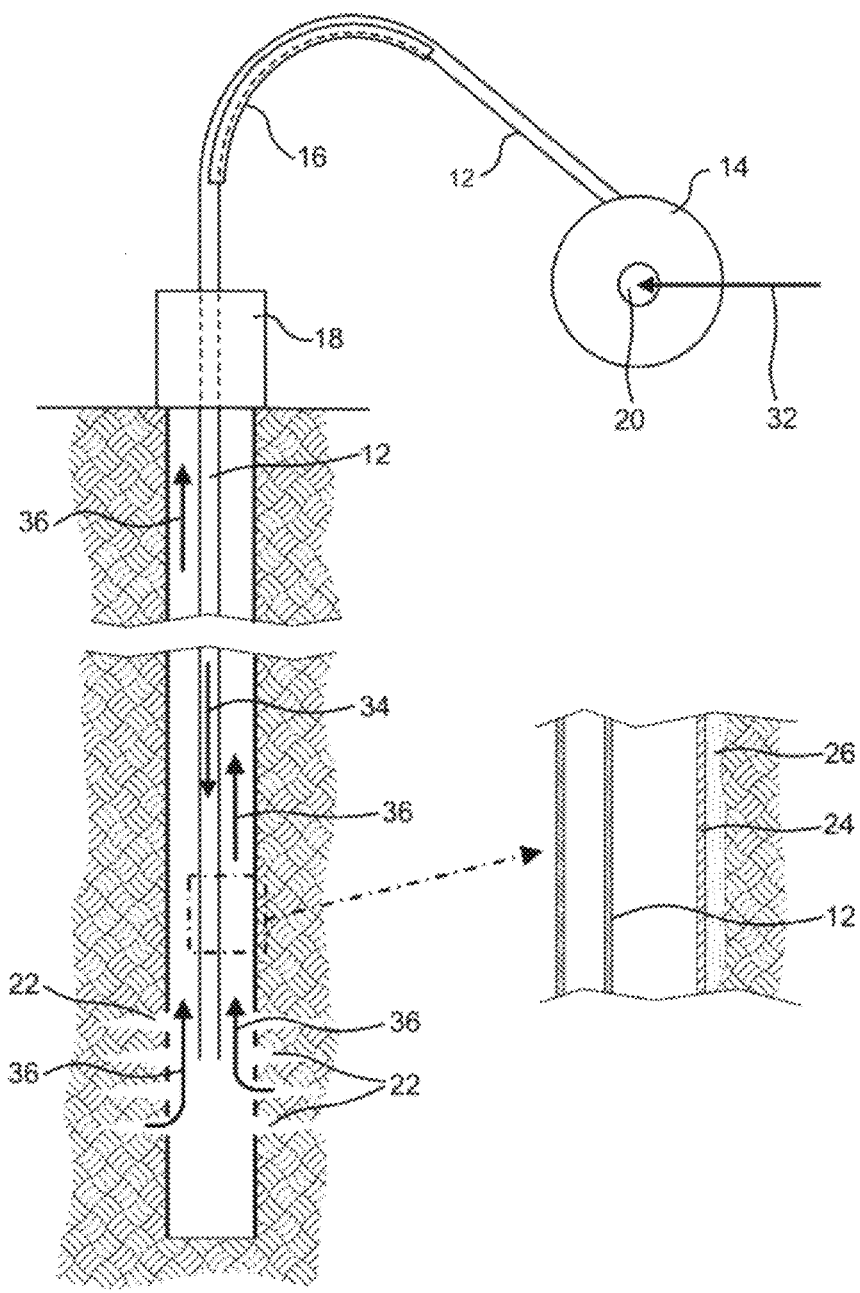
FIG. 21 is a schematic illustration of the use of coiled tubing in a matrix acidizing job, with a portion of the wellbore shown enlarged.

As shown by the enlarged portion of FIG. 21, the casing 24 lines the wellbore and is surrounded by cement 26. The perforations 22 extend through the casing and cement into the surrounding geological formation. The casing 24 can be made of any of various types and weights of steel.

An inlet 20 to the coiled tubing is provided on the reel axis. In order to treat the formation, an acidic formulation (e.g., including hydrochloric acid) is pumped into the coiled tubing 12 through its axial inlet as diagrammatically indicated by arrow 32 and down the coiled tubing 12 in the direction of arrow 34 to the formation which is to be treated. During this main pumping stage, the acid formulation can include 0.01 wt % to 1 wt % of a polymeric corrosion inhibitor having a weight average molecular weight equal or less than 100,000 g/mol together with an intensifier including a Cu salt and KI in which the molar ratio of copper to iodide ions is 1:X where X is greater than or equal to 2. For instance, X, may be 2, 3, 5, 7.5, 10, 50, 75, 100, 500, 1000, or any value therebetween.

The selection of the polymer used as the ACI, its degree of modification and the modifier chosen will depend on the type(s) of steel that will be contacted by the acid formulation during the operation. The concentration of polymeric corrosion inhibitor and concentration of intensifier chosen can be varied depending, for example, on the temperature within the wellbore.

The degree of modification of the polymer is selected in order that the modified polymer is substantially entirely soluble in the acidic aqueous solution to which it is to be added for use as an acid corrosion inhibitor. This can be determined through straightforward empirical experimentation for any desired acidic solution. For example, for an acid aqueous solution having 4 mol HCl at 80° C., PVPy can be modified by 24 mol % naphthylmethyl modifier and remain entirely soluble but will not be fully soluble if modified by 44 mol %. The degree of modification is also selected in order that the resulting formulation provides greater corrosion inhibition for the metal(s) being treated than the same formulation but with the unmodified base polymer.

Although the described acid corrosion inhibitors include polymers modified to include a naphthylmethyl modifier, it will appreciated that other fused ringed modifiers may be used. Where alternatives with a greater number of fused aromatic rings are used, the threshold mol % modification before the modified polymer becomes acid-insoluble is likely to be lower.

The polymeric acid corrosion inhibitor is added the acid so as to be present at a concentration below its critical overlap concentration (c*). c* will depend upon the polymer used, including its degree of modification, and the concentration and temperature of the acidic fluid. c* for any particular acid formulation can be determined straightforwardly through experimentation by identifying changes in the concentration-dependence of the specific viscosity of the formulations as a function of polymer concentration through the dilute and semi-dilute regimes. It will be appreciated that the formulations described herein could be of use in other operations in which metal is contacted with aqueous acids, such as for example those described in the background section of this application.

INDUSTRIAL APPLICABILITY

As discussed herein, the inventors have investigated and quantified the inhibition efficiency of monomeric inhibitors (with or without an intensifier) and polymeric inhibitors as a function of time, including that the inhibition efficiency profile of polymeric inhibitors differs from monomeric inhibitors. In particular, monomeric inhibitors can be fast acting, i.e., they reach their maximum corrosion inhibition potential rapidly, but that subsequently their efficiency decreases over time. On the other hand, polymeric inhibitors are relatively slow acting but maintain a higher efficiency over time, i.e., they provide a more persistent inhibition performance. For example, during contact with an acid for a period of three hours, under dynamic flow conditions, when a monomeric acid corrosion inhibitor (ACI) is present the rate of corrosion is observed to increase over the period and thus most of the weight loss occurs in the latter part of the period. Conversely, when a polymeric inhibitor is present, most of the weight loss occurs in a period immediately following initial contact with the acid, before the polymeric ACI has reached its full efficiency.

Surprisingly, a combination of a polymeric inhibitor with an intensifier as per the present disclosure provides faster acting corrosion inhibition as seen with a monomeric inhibitor but, in addition, the high inhibition efficiency is maintained over time. Moreover, the combination significantly reduces any potential for galvanic corrosion.

By using a polymeric acid corrosion inhibitor (ACI) in combination with certain metal iodide intensifiers, there is also a surprising and synergistic improvement in inhibition performance over the use of either alone. As such and according to a first aspect of the disclosure there is provided an aqueous acidic formulation including an acid, a polymeric acid corrosion inhibitor, and an acid corrosion inhibitor intensifier. The intensifier can include iodide ions and metal ions, with the metal ions being one or more of copper, silver, bismuth, or antimony.

Formulations of the disclosure provide substantially improved corrosion inhibition over a polymeric inhibitor alone or a monomeric inhibitor with or without an intensifier. The improved inhibition performance provided by the claimed composition(s) is attributed to a synergistic effect between the polymer and the metal ion.

It has also been observed that the polymeric ACI acts to regulate the deposition of the metal ion(s) providing a relatively uniform distribution of reduced metal(s) across the treating surface as compared with the relatively heterogeneous deposition pattern observed when no inhibitor is used. This regulation of the extent and distribution of reduced metal is believed to be achieved by a balance between a rapid cathodic inhibition process, and a slower anodic inhibition process plus some degree of co-adsorption. Consequently, the reduced metal is able to provide cathodic corrosion inhibition across the surface to be treated thus contributing to the effectiveness of the corrosion inhibition composition, while the formation of heterogeneously electrodeposited metal areas large enough to act as microcathodes is largely avoided or at least significantly reduced.

Surprisingly, it is also observed that the polymeric ACI acts to regulate the amount of dissolved metal that deposits on the treating surface. For example, with certain steels such as N80 casing carbon-steel, a polymeric ACI appears to reduce the amount of copper that is deposited on the steel surface, as compared with when the same surface is contacted with CuI alone, whereas with other steels, such as HS80 coiled tubing low carbon steel, comparatively less copper is deposited (as compared with N80 steel) when contacted with CuI alone and the polymeric ACI acts to increase the amount of copper deposited on the HS80 surface. Thus, the polymeric ACI acts to regulate the electrodeposition of copper on the treating surfaces and, in both cases, such regulation results in a significant improvement in the efficiency of corrosion inhibition without significant galvanic corrosion effects.

Further, the use of the combination of copper ions and iodide ions with a polymeric ACI has been shown to increase the amount of polymeric ACI that is adsorbed onto the treating surface as compared with when the polymeric ACI is used alone or with metal salts that do not readily electrodeposit on the treating surface.

Notwithstanding the discovery that the use of a polymeric ACI provides greater resistance to galvanic corrosion, thus allowing greater amounts of metal containing intensifier to be used, it has also been discovered that it is highly favorable that a composition include a molar ratio of metal ions to iodide ions of 1:X where X≥2. In many instances it is more preferable that X is much greater, e.g. X≥5. For instance, X may be between 5 and 100, up to 500, or even possibly as high as 1,000 or greater. Although not wishing to be bound to a particular theory, it is believed that effectiveness of this novel ratio is because a relatively large concentration of iodide ions promotes adsorption of the polymeric ACI onto the treating surface, while only a relatively low concentration of electrodepositing metal ions is required to provide the optimum or near optimum degree of corrosion inhibition protection.

This ratio is believed to have independent inventive merit and thus according to a further aspect of the disclosure there is provided an aqueous acidic formulation including an acid, a polymeric acid corrosion inhibitor, and an acid corrosion inhibitor intensifier including iodide ions and metal ions, where the molar ratio of metal ions to iodide ions is 1:X, where X is greater than or equal to two.

Compositions of an aqueous acid formulations described herein may be selected, e.g. through selecting the concentration of polymeric ACI and/or intensifier(s), such that the open circuit potential (OCP) (i.e. the equilibrium potential assumed by the treating surface in the absence of electrical connections to the metal) of the system equilibrates (e.g. drops) to within ±15%, and potentially to within ±3%, of a baseline-OCP for the same treating surface in contact with the acid alone. Such an equilibrium position of the OCP indicates that the combined polymeric ACI and electrodepositing metal salt intensifier system can be selected to exhibit so-called "mixed" inhibition which minimises the potential for subsequent galvanic corrosion.

A polymeric acid corrosion inhibitor, which can be soluble in the acid, may include nitrogen (i.e., it is a N-comprising polymer). The polymeric acid corrosion inhibitor may include nitrogen(s) that carry a permanent cationic charge and/or nitrogen(s) that become protonated in the acid solution. Such polymers can form complexes with the electrodepositable metal ion(s).

A polymeric acid corrosion inhibitor may incorporate nitrogen comprising functional groups on each and every repeat unit or only on some of the repeat units. Such functional groups may include primary, secondary, or tertiary amine groups and/or heterocyclic nitrogen(s) and/or quaternary ammonium nitrogen(s). Thus, the polymeric acid corrosion inhibitor(s) may include repeat units containing amine groups, heterocyclic nitrogen groups, quaternary ammonium nitrogen groups, or some combination thereof.

Polymeric acid corrosion inhibitors may include a homopolymer, wherein each repeat unit may include at least one nitrogen atom. Alternatively, or in addition, the polymeric acid corrosion inhibitor may include a co-polymer having two or more different constituent repeat units wherein at least one of the copolymers, and possibly both, include nitrogen.

The polymer may include three or more constituent repeat units as these polymers display to a greater extent the advantages of a polymer over the respective monomer. When greater than three repeat units are present, the polymer may be linear or branched. The acid corrosion inhibitor formulation may include a mixture of polymeric and non-polymeric constituents.

In some aspects, the polymeric acid corrosion inhibitor includes a polymer having a backbone of a continuous chain of carbon atoms, a continuous chain of carbon and oxygen atoms, a continuous chain of carbon and nitrogen atoms, or some combination thereof. The backbone of the polymer may be aliphatic.

In the past, the inhibition efficiency of PVPy modified with aliphatic chains (decyl and isopentyl) has been tested by different degrees, which led to a conclusion that inhibition efficiency is independent of the degree of modification. In other cases, the degree of modification of polyethylenimine (PEI) by benzyl groups was tested. The degree of modification was varied (e.g., between 41% and 55%), and the higher the degree of modification, the higher the inhibition efficiency.

In view of the present disclosure, the use of a polymeric acid corrosion inhibitor having a backbone of nitrogen-comprising repeat units and multiple fused ringed modifier groups provides significantly improved corrosion inhibition as compared with a polymer modified to include single ringed modifiers such as benzyl groups.

It has been discovered that, for a given pre-modified (base) polymer, the inhibition efficiency of the polymer with x mol % naphthylmethyl groups (each group containing two fused aromatic rings) is significantly greater than the same polymer modified with 2× mol % benzyl groups (each group containing one aromatic ring).

It is believed that fused ringed modifiers provide improved corrosion inhibition over single ringed modifiers because of their comparatively large planer structure of high electron density which more effectively overlays and interacts with the metal surface. Nevertheless, for improved corrosion inhibition to be observed it is necessary for the modified polymer to be soluble in the acidic aqueous fluid. Unlike known benzyl modified polymeric acid corrosion inhibitors, there is a maximum degree of modification beyond which a polymer carrying multiple fused ringed modifiers will cease to be soluble in aqueous acid fluids commonly used for the processes described in the introduction of this application.

For a given concentration of polymer, the degree of modification at which the modified polymer becomes at least partially insoluble depends on factors including: the acid and its concentration, the temperature of the fluid, the chemistry and molecular weight of the unmodified polymer and the presence of other constituents in the fluid.

The degree of modification of the modified polymer is optionally selected from a selection of possible degrees of modification in order to substantially maximize the corrosion inhibition of the metal.

The degree of modification that provides the best results may depend on factors including but not limited to the acid and its concentration, the temperature of the fluid, the chemistry and molecular weight of the unmodified polymer, the presence of other constituents in the fluid, and the metal or metals being treated.

Surprisingly, it has been found that polymers modified by a relatively low degree with multiple fused aromatic ringed comprising groups can provide most if not substantially equivalent corrosion inhibition to polymers modified by a greater degree of either single ringed or multiple fused ringed modifiers. The degree of modification of the polymer with multiple fused aromatic rings may be less than 25 mol %. As such, the degree of modification may be equal or less than 10 mol %, such as between 0.5 mol % and 10 mol %.

Each repeat unit may include nitrogen that is free to react (modifiable) with the modifier modifiable nitrogen; alternatively the backbone may include repeat units some of which have modifiable nitrogen and others that do not have nitrogen or modifiable nitrogen. In the latter case, the degree of modification of the polymer may be based upon only the repeat units that have modifiable nitrogen. The pre-modified (base) polymer may include a homopolymer and/or a copolymer. The polymer may include three or more constituent repeat units as these polymers display to a greater extent the advantages of a polymer over the respective monomer. When greater than three repeat units are present, the polymer may be linear or branched.

In some embodiments, a base polymer may include a backbone having a continuous chain of carbon atoms, and/or a continuous chain of carbon and oxygen atoms and/or a continuous chain of carbon and nitrogen atoms. The backbone of the polymer may be aliphatic.

The modifier groups may be electron donating (i.e. they have a high electron density). This promotes so-called "chemi-sorption" and thus provides greater inhibition efficiency at higher temperatures.

The polymer may be modified using an alkyl-naphthyl group. In one embodiment the modifier may include naphthylmethyl. It will be appreciated that the fused aromatic modifier group may include more than two fused aromatic rings. For example the modifier may incorporate three fused aromatic rings, e.g. phenanthrene or anthracene or four fused aromatic rings, e.g. benzophenanthrene, tetracene, chrysene or pyrene. It is believed that these polymers will provide a greater corrosion inhibition effect compared to the same base polymer modified with naphthylmethyl because of their greater size. However, the insolubility of polymers including such large planar structures (with three or four fused aromatic rings) will be reached, for a given acidic aqueous fluid, at lower degrees of modification than polymers incorporating only naphthylmethyl modified groups.

The modifiable nitrogen of the base-modified polymer may be within the polymer backbone and/or pendant thereto.

The base polymer may include one or more from a large range of different modifiable nitrogen-containing polymers and co-polymers. For example, the un-modified polymer may include one or more of: polyallyl amine (or a copolymer containing polyallylamine repeat units); polyethylenimine (PEI) (or a copolymer containing PEI repeat units); poly(4-vinylpyridine) (PVPy) (or a copolymer containing PVPy repeat units); a polysaccharide that includes amine groups; or chitosan. Optionally the base polymer may include one or more of polyethylenimine (PEI); poly(4-vinylpyridine) (PVPy) or chitosan.

The polymer may include a dual modified polymer, namely a polymer modified with two different modifiers. One of the modifiers may be selected in order to increase the solubility of the polymeric acid corrosion inhibitor. For example the polymeric acid corrosion inhibitor may be modified with a first modifier that is relatively insoluble such as napthylmethyl and also a second modifier that is relatively soluble in comparison such as propylamine. In this way it may be possible to increase the overall degree of modification of the first, relative insoluble modifier whilst maintaining or increasing solubility of the polymeric acid corrosion inhibitor within the aqueous acid. The relatively soluble modifier may be aliphatic and may contain charged or protonability functionality which increase acid solubility.

The polymeric acid corrosion inhibitor may be present at a concentration below its critical overlap concentration (c*) in the acidic aqueous fluid. This ensures the polymer does not significantly increase the viscosity of the aqueous acidic fluid.

The polymeric acid corrosion inhibitor may be present, and potentially fully dissolved, in the inhibited acidic fluid at a concentration of at least 0.005 wt %, such as between 0.01 wt % and 1 wt %.

The polymeric acid corrosion inhibitor may have a weight average molecular weight less than 100,000 g/mol, and potentially less than 20,000 g/mol. The average molecular weight of a polymer is related to its intrinsic viscosity via the Mark-Houwink equation $[\eta]=KM^a$ where 'K' and 'a' are the Mark-Houwink constants and 'M' is molecular weight. Further, for typical random coil polymers, the critical overlap concentration, c*, is related to the intrinsic viscosity $[\eta]$ by $c^* \approx 4/[\eta]$. As such, for many polymers with molecular weights of 100000 g/mol or below, c* will be higher than 2 wt %. The latter concentration is much higher than the typical concentration of a polymeric acid corrosion inhibitor that will be present in the aqueous acidic formulation for the purposes described in the introduction.

Further, polymers with weight average molecular weight below 100,000 g/mol are preferred because, and although not wishing to be bound to any theory, the inventors speculate that, for applications such as acidizing, relatively small polymer molecules will not cause significant formation damage during and after acidizing flowback as compared to higher molecular weight. The polymeric acid corrosion inhibitor may include a mixture of polymeric and non-polymeric constituents.

The polymeric ACI may include a homo-polymer. The polymeric acid corrosion inhibitors may include one or more of the following homo-polymers: polyallylamine; poly(vinylamine) hydrochloride; poly(l-lysine) hydrobromide; polydiallyldimethylammonium chloride; polyvinylpyridine (PVPy); polyvinylquinoline (PVQ); polyvinylpyrrolidone (PVP); polyvinylcaprolactam (PVC); chitosan; aminated cellulose; aminated starch; polyethylenimine (PEI); and polypropylenimine (PPI).

The polymeric ACI may include a copolymer. A number of the repeat units which constitute several of the homo-polymeric acid corrosion inhibitors given in the prior paragraph can be present in co-polymeric acid corrosion inhibitors such as those given in the following list: poly(allylamine)-graft-poly(N-isopropylacrylamide); poly(etheramine); poly(ethylene glycol)-block-polyethylenimine (PEG-PEI); poly(vinylpyridine-co-styrene); poly(vinylpyridine-co-butyl methacrylate); poly(vinylpyrrolidone-co-vinylacetate); poly(vinylpyrrolidone-co-styrene); and poly(vinylpyrrolidone-co-dimethylaminoethyl methacrylate). The polymeric acid corrosion inhibitor may include more than one of the mentioned polymers.

A polymeric acid corrosion inhibitor may include one or more polymers modified with alkyl groups, aromatic groups, alkyl-aromatic groups, alkyl amino groups, or a combination thereof. Through modification, it is possible to tailor the polymeric acid corrosion inhibitor to provide greater protection depending on the material that provides the treating surface. For example, for the treatment of certain materials, e.g. duplex stainless steel, polymers modified in this way show increased adsorption of both polymer and copper to the surface, polymers modified to a greater degree showing a higher amount of adsorption. The degree of modification is also optionally selected to ensure solubility of the polymeric acid corrosion inhibitor in the acidic solution. Modifiers that include cyclic groups are may be preferentially selected, and those with multiple cyclic groups even more so.

A modified polymeric acid corrosion inhibitor may include one or more of the polymers given in the following list: PEI modified with heptyl; PEI modified with benzyl; PEI modified with methyl naphthyl; PVPy modified with benzyl; PVPy modified with methyl naphthyl; PVPy modified with both benzyl and propylamine; PVPy modified with both methyl naphthyl and propylamine; chitosan modified with benzyl; chitosan modified with methyl naphthyl; and combinations thereof. Such modifications introduce alkyl and/or alkyl aromatic groups which enhance and strengthen interactions with the treating surface to achieve a higher inhibition efficiency. The same modifications may create nitrogen(s) that carry a permanent cationic charge (quaternisation). The degree of modification may be optimized to maximise inhibition efficiency and ensure solubility of the polymeric acid corrosion inhibitor in the acidic solution.

Further, the polymeric acid corrosion inhibitor may include one or more polymers or copolymers modified with polymerizable groups such as acetylenic alcohol groups, for example PVPy modified with Oct-1-yn-3-ol. Optionally, PVPy may be modified with pyrrolidone groups, e.g. PVPy modified with 2-pyrrolidone.

A polymeric acid corrosion inhibitor may include polymer(s) modified with pyridyl, quinolyl, hydrogenated pyridyl and/or hydrogenated quinolyl groups. For example, the ACI may include PVPy modified with (1,2,3,4-tetrahydroquinolin-1-yl) propane.

A polymeric acid corrosion inhibitor may include a dual modified polymer, such as a polymer modified with two different modifiers. One of the modifiers may be selected in order to increase the solubility of the polymeric acid corrosion inhibitor. For example the polymeric acid corrosion inhibitor may be modified with first modifier that is a relatively insoluble such as benzyl or napthylmethyl and also a second modifier that is relative soluble in comparison such as propylamine. In this way it may be possible to increase the overall degree of modification of the first, relatively insoluble modifier while maintaining or increasing solubility of the polymeric acid corrosion inhibitor within the aqueous acid.

The polymeric acid corrosion inhibitor may be present in the aqueous acidic formulation at a concentration below its critical overlap concentration. This can ensure that presence of the polymeric acid corrosion inhibitor does not significantly increase the viscosity of the acidic solution into which it is mixed. In addition, for some applications, for example acidizing applications, the use of low molecular weight polymeric acid corrosion inhibitors present at a dosage or concentration well below their critical overlap concentration in the acidizing fluid is likely to minimize a potential for incomplete removal of the polymers during the acid flowback stage. The critical overlap concentration (often termed c*) is the lowest concentration of a polymer in a solvent at which the hydrodynamic volume of the polymer chains will experience overlap. At concentrations of polymer below c* (i.e. at concentrations of polymer in the "dilute" regime), the specific viscosity of the polymer solution increases linearly with polymer concentration (the specific viscosity, $\eta_{sp}$, is given by the relationship $(\eta-\eta_s)/(\eta_s)$ where $\eta$ is the viscosity of the polymer solution and $\eta_s$ is the viscosity of the solvent). Relative to the dilute regime, at concentrations of polymer above c* (i.e. in the "semi-dilute" regime), the slope of the relationship between $\eta_{sp}$, and polymer concentration is greater leading to a more significant effect of the polymer on the viscosity of the aqueous acidic solution. The critical overlap concentration for a specific polymer will depend upon the solvent properties in which it is dissolved. The parameter c* can be determined through empirical experimentation and log-log plots of $\eta_{sp}$ versus concentration.

Optionally, the polymeric acid corrosion inhibitor is present within the aqueous acidic formulation in an amount between 0.005 wt % and 1 wt % (inclusive). In more specific aspects, the polymeric acid corrosion inhibitor is present within the aqueous acidic formulation in an amount between 0.01 wt % and 0.05 wt. % (inclusive).

A polymeric acid corrosion inhibitor may have a weight average molecular weight less than 100,000 g/mol, and even less than 20,000 g/mol. The average molecular weight of a polymer is related to its intrinsic viscosity via the Mark-Houwink equation $[\eta]=KM^a$ where 'K' and 'a' are the Mark-Houwink constants and 'M' is molecular weight. Further, for typical random coil polymers, the critical overlap concentration, c*, is related to the intrinsic viscosity $[\eta]$ by $c^* \approx 4/[\eta]$. As such, for many polymers with molecular weights of 100,000 g/mol or below, c* will be higher than 2 wt %. The latter concentration is much higher than the typical concentration of a polymeric acid corrosion inhibitor that will be present in the aqueous acidic formulation for purposes described herein.

Further, polymers with weight average molecular weight below 100,000 g/mol may be selected because, and although not wishing to be bound to any theory, for at least acidizing applications, relatively small polymer molecules are not expected to cause any significant formation damage during and after acidizing flowback, as compared to higher molecular weight polymers.

The iodide ions of the intensifier component(s) of example aqueous acidic formulation can be provided through an iodide salt, for example via the addition of one or more of: alkali metal iodide salt; ammonium iodide salt; or substituted (alkylated) ammonium iodide salt. Most or all of the iodide ion concentration may be provided from iodide salt(s) other than copper iodide, silver iodide, bismuth iodide, or antimony iodide.

Example formulations of some aspects may include a metal salt as the source of the metal ion intensifier. Example metal salts include one or more of a metal halide, a metal oxide, or a metal oxy-anion salt. The metal oxy-anion salt may include one or more of the groups: carboxylate; sulphate; carbonate; or phosphate. Example metal salts include copper(I) iodide, copper(I) chloride, and copper(II) chloride. The corrosion inhibitor intensifier may include mixtures of salts which are sources of both iodide and metal ions, e.g. mixtures of potassium iodide and copper(I) chloride. The metal comprising salt and the iodide comprising salt may be added at the same time or separately.

Copper, silver, bismuth, and antimony are each able to electro-deposit on ferrous surfaces and/or co-adsorb with iodide and polymeric acid corrosion inhibitor(s) and thus are suitable metal ions for the purpose. Optionally, copper, silver, bismuth are selected. For instance, copper may be selected because of its ability to form various complexes with nitrogen containing polymer ACIs.

Where silver oxide is used, the aqueous acidic formulation may further include a reducing agent to promote electro-deposition of the metal ions onto the metal surface to be protected. Examples of possible reducing agents are sodium borohydride, ascorbic acid, and combinations thereof.

An acid may be a mineral acid or a mixture of mineral acids. Examples include hydrochloric acid, hydrofluoric acid, and mixtures thereof. Depending on the application, organic acids may be used, e.g. in a mixture.

The aqueous acidic formulation may be used for inhibiting corrosion of ferrous surfaces that are contacted with an aqueous acid. Examples include low carbon steels used to fabricate coiled tubing (e.g. HS-80™, HS-90™, and HS-110™ grade coiled tubing supplied by TENARIS), typical carbon steels used to fabricate oilwell casing (e.g. N80, L80) or corrosion resistant alloys such as duplex stainless steels. Contact between the aqueous acidic formulation and one or more of these surfaces may occur at elevated temperatures e.g. above 150° C.

An aqueous acidic formulation herein described may be used to treat subterranean formations penetrated by a wellbore, for example oil and gas wells, while minimizing/preventing corrosion to metal, and in particular, minimizing/preventing corrosion of ferrous metal surfaces within the wellbore that the aqueous acidic fluid contacts. The aqueous acidic formulations may be, for example: a matrix acidizing fluid in which water may be intentionally added to an inorganic and/or organic acid for reservoir stimulation purposes; an acid fracturing fluid; acidic waters produced from hydrocarbon reservoirs (wherein the acidity may be due to co-produced acid gases ($CO_2$, $H_2S$) and/or naturally occurring carboxylic acids); or acidic waters generated during $CO_2$ injection operations, e.g. for enhanced oil recovery or carbon sequestration purposes.

In an associated method, the polymeric acid corrosion inhibitor and intensifier are added to the aqueous acid and the resulting formulation is then pumped into the wellbore.

The use of a low molecular weight polymer as a polymeric acid corrosion inhibitor in an acid formulation at a concentration below its critical overlap concentration is also thought to be independently inventive and thus according to a further aspect of the disclosure there is provided a method of treating a subterranean formation penetrated by a wellbore comprising flowing an aqueous acidic formulation through a wellbore into the subterranean formation, wherein the aqueous acidic formulation includes an acid and a polymeric acid corrosion inhibitor. The polymeric acid corrosion inhibitor can be present at a concentration below its critical overlap concentration, and the polymeric acid corrosion inhibitor can have an average molecular weight of less than or equal to 100,000 g/mol.

According to an aspect that may be combined with any one or more other aspects herein, a polymeric acid corrosion inhibitor includes a polymer that includes nitrogen.

According to an aspect that may be combined with any one or more other aspects herein, a polymeric acid corrosion inhibitor includes a polymer having three or more constituent repeat units.

According to an aspect that may be combined with any one or more other aspects herein, the polymer of a polymeric acid corrosion inhibitor has a molecular weight less than 100,000 g/mol.

According to an aspect that may be combined with any one or more other aspects herein, a polymeric acid corrosion inhibitor is present at a concentration below its critical overlap concentration.

According to an aspect that may be combined with any one or more other aspects herein, a polymeric acid corrosion inhibitor is present at a concentration of less than 1 wt %, or between 0.01 wt % and 0.05 wt %.

According to an aspect that may be combined with any one or more other aspects herein, a formulation includes an iodide salt as a source of the iodide ions.

According to an aspect that may be combined with any one or more other aspects herein, an iodide salt includes at least one of: an alkali metal iodide salt; an ammonium iodide salt; or a substituted (alkylated) ammonium iodide salt.

According to an aspect that may be combined with any one or more other aspects herein, an aqueous acidic formulation includes a source of the metal ions, with the source including at least one of: a metal halide; a metal oxide; or a metal oxy-anion salt.

According to an aspect that may be combined with any one or more other aspects herein, a metal oxy-anion salt includes one or more from the any of the groups: carboxylate; sulphate; carbonate; or phosphate.

According to an aspect that may be combined with any one or more other aspects herein, metal ions include copper ions.

According to an aspect that may be combined with any one or more other aspects herein, the metal ion to iodide ion molar ratio is 1:X, where X is greater than or equal to two. For instance, the molar ratio can be between 1:5 and 1:100.

According to an aspect that may be combined with any one or more other aspects herein, a polymeric acid corrosion inhibitor includes a polymer having a backbone with a continuous chain of carbon atoms, carbon and oxygen atoms, or carbon and nitrogen atoms.

According to an aspect that may be combined with any one or more other aspects herein, a polymeric acid corrosion inhibitor includes one or more of: polyallylamine; poly(vinylamine) hydrochloride; poly(l-lysine) hydrobromide; polydiallyldimethylammonium chloride; polyvinylpyridine (PVPy); polyvinylquinoline (PVQ); polyvinylpyrrolidone (PVP); polyvinylcaprolactam (PVC); chitosan; aminated cellulose; aminated starch; polyethylenimine (PEI); or polypropylenimine (PPI).

According to an aspect that may be combined with any one or more other aspects herein, the acid corrosion inhibitor intensifier can include silver oxide and a reducing agent to reduce the silver oxide to provide the metal ions.

According to an aspect that may be combined with any one or more other aspects herein, a reducing agent includes sodium borohydride, ascorbic acid, or a combination thereof.

According to an aspect that may be combined with any one or more other aspects herein, a polymeric acid corrosion inhibitor includes a polymer modified with one or more of: alkyl groups; aromatic groups; alkyl-aromatic groups; alkyl amino groups; pyrrolidone groups; or acetylenic alcohol groups.

According to an aspect that may be combined with any one or more other aspects herein, a polymeric acid corrosion inhibitor includes one or more polymers from the list of: PEI modified with heptyl; PEI modified with benzyl; PEI modified with methyl naphthyl; PVPy modified with benzyl; PVPy modified with methyl naphthyl; PVPy modified with both benzyl and propylamine; PVPy modified with both methyl naphthyl and propylamine; Chitosan modified with benzyl; Chitosan modified with methyl naphthyl. PVPy modified with Oct-1-yn-3-ol; PVPy modified with 2-pyrrolidone or PVPy modified with (1;2;3;4-tetrahydroquinolin-1-yl) propane; poly(allylamine)-graft-poly(N-isopropylacrylamide); poly(etheramine); poly(ethylene glycol)-block-polyethylenimine (PEG-PEI); poly(vinylpyridine-co-styrene); poly(vinylpyridine-co-butyl methacrylate) poly(vinylpyrrolidone-co-vinylacetate); poly(vinylpyrrolidone-co-styrene); or poly(vinylpyrrolidone-co-dimethylaminoethyl methacrylate).

According to an aspect that may be combined with any one or more other aspects herein, a polymeric acid corrosion inhibitor includes a polymer modified with one or more of pyridyl, quinolyl, hydrogenated pyridyl, or hydrogenated quinolyl groups.

According to an aspect that may be combined with any one or more other aspects herein, an aqueous acidic formulation includes a complex comprised from the combination of the metal ions with a polymer of the polymeric acid corrosion inhibitor.

According to an aspect that may be combined with any one or more other aspects herein, the composition of the aqueous acid formulation is selected, when contacted with a treating surface to provide an open circuit potential (OCP) that drops to within ±15% (or even within ±10%, ±5%, or ±3%) of the baseline-OCP for the treating surface in contact with the uninhibited acid.

According to an aspect that may be combined with any one or more other aspects herein, a metal surface is contacted with an acidic fluid, and the metal surface is within a wellbore.

According to an aspect that may be combined with any one or more other aspects herein, a method of treating a formation penetrated by a wellbore includes flowing an acidic formulation through a wellbore into a subterranean formation.

According to an aspect that may be combined with any one or more other aspects herein, the polymeric acid corrosion inhibitor is present at a concentration of 0.01 wt % to 1 wt %.

According to an aspect that may be combined with any one or more other aspects herein, an aqueous acidic formulation includes an acid corrosion inhibitor intensifier.

According to an aspect that may be combined with any one or more other aspects herein, a method of producing an inhibited acidic aqueous fluid includes providing an acidic aqueous fluid with a polymeric acid corrosion inhibitor that includes a polymer having a backbone with nitrogen-comprising repeat units, at least some of the nitrogen-comprising repeat units being modified to include a modifier with multiple fused aromatic rings. The polymer added to the acidic aqueous fluid is selected based on a degree of modification of the modified polymer in order to provide improved corrosion inhibition of a metal to be exposed to the inhibited acidic aqueous fluid relative to the corrosion inhibition provided by the non-modified polymer for that metal, and to be substantially soluble in the acidic aqueous fluid.

According to an aspect that may be combined with any one or more other aspects herein, the degree of modification of a modified polymer is selected in order to substantially maximize the corrosion inhibition of the metal.

According to an aspect that may be combined with any one or more other aspects herein, the degree of modification is up to 25 mol %, or up to 10 mol %.

According to an aspect that may be combined with any one or more other aspects herein, the degree of modification is the degree of modification of nitrogen-comprising repeat units.

According to an aspect that may be combined with any one or more other aspects herein, a modifying agent used to modify the polymer includes alkyl-naphthyl, or at least one of an alkyl-naphthyl group or a methyl naphthyl group.

According to an aspect that may be combined with any one or more other aspects herein, the polymer includes at least one of polyallyl amine, a copolymer containing polyallylamine repeat units, polyethylenimine (PEI), a copolymer containing PEI repeat units, poly(4-vinylpyridine) (PVPy), a copolymer containing PVPy repeat units, a polysaccharide, a modified polysaccharide that includes one or more amine groups, or chitosan.

According to an aspect that may be combined with any one or more other aspects herein, a corrosion inhibition intensifier is added to the acidic aqueous fluid.

According to an aspect that may be combined with any one or more other aspects herein, the corrosion inhibition intensifier includes at least one of iodide or copper. Optionally, the molar ratio of copper ions to iodide ions is 1:X, where X is greater than or equal to two.

According to an aspect that may be combined with any one or more other aspects herein, the pre-modified polymer has a molecular weight less than 100,000 g/mol.

According to an aspect that may be combined with any one or more other aspects herein, the modified polymeric acid corrosion inhibitor is present in the inhibited acidic aqueous fluid at a concentration below its critical overlap concentration.

According to an aspect that may be combined with any one or more other aspects herein, the polymeric acid corrosion inhibitor is present in the inhibited acidic fluid at a concentration of between 0.01 wt % and 1 wt %.

According to an aspect that may be combined with any one or more other aspects herein, an inhibited acidic aqueous fluid includes an acidic aqueous fluid and a polymeric acid corrosion inhibitor including a polymer having a backbone of repeat units modified to include a modifier comprising multiple aromatic rings.

According to an aspect that may be combined with any one or more other aspects herein, a method of reducing corrosion of a metal surface that is contacted with an acidic aqueous fluid includes adding the acidic aqueous fluid a polymeric acid corrosion inhibitor that includes a polymer having a backbone having nitrogen-comprising repeat units, at least some of the repeat units modified to include a modifier groups including multiple fused aromatic rings. The polymer added to the acidic aqueous fluid can be selected based on its degree of modification in order to provide improved corrosion inhibition of a metal to be exposed to the inhibited acidic fluid relative to the corrosion inhibition provided by the non-modified polymer for that metal, and to be substantially soluble in the acidic aqueous fluid.

According to an aspect that may be combined with any one or more other aspects herein, the metal surface is ferrous and/or within a wellbore.

The description or claims may at times refer to a further, additional, or other element, feature, aspect, component, material, compound or the like. Such reference does not preclude there being a single element, or more than one, of the additional element. Where the claims or description refer to "a" or "an" element, such reference is not be construed that there is just one of that element, but is instead to be inclusive of other components and understood as "at least one" of the element. It is to be understood that where the description and claims state that a component, feature, structure, function, or characteristic "may," "might," "can," or "could" be included, that particular component, feature, structure, or characteristic is provided in some embodiments, but is optional for other embodiments of the present disclosure. Where numeric ranges are included, such ranges should be understood to include the endpoints of such ranges, as well as any sub-range within such ranges.

Although various example embodiments have been described in detail herein, those skilled in the art will readily appreciate in view of the present disclosure that many modifications are possible in the example embodiments without materially departing from the present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

While embodiments disclosed herein may be used in connection with matrix acidizing in a downhole environment, such environment is merely illustrative. Systems, tools, assemblies, methods, compositions, formulations, and other components of the present disclosure, or which would be appreciated in view of the disclosure herein, may be used in other applications and environments, including in automotive, aquatic, aerospace, hydroelectric, manufacturing, and telecommunications industries.

The Abstract at the end of this disclosure is provided to allow the reader to quickly ascertain the general nature of some embodiments of the present disclosure. It is submitted with the understanding that it will not be used to interpret or limit the scope or meaning of the claims.

What is claimed is:

1. An aqueous acidic formulation comprising:
    an acid;
    a polymeric acid corrosion inhibitor; and
    an acid corrosion inhibitor intensifier including iodide ions and copper ions, a molar ratio of the copper ions to the iodide ions being between 1:5 and 1:100.

2. The aqueous acidic formulation of claim 1, the polymeric acid corrosion inhibitor including a polymer that includes nitrogen.

3. The aqueous acidic formulation of claim 1, the polymeric acid corrosion inhibitor including a polymer having three or more constituent repeat units.

4. The aqueous acidic formulation of claim 1, the polymer of the polymeric acid corrosion inhibitor having a molecular weight less than 100,000 g/mol.

5. The aqueous acidic formulation of claim 1, the polymeric acid corrosion inhibitor being present at a concentration below its critical overlap concentration.

6. The aqueous acidic formulation of claim 5, the polymeric acid corrosion inhibitor being present at a concentration of between 0.01 wt % and 1 wt %.

7. The aqueous acidic formulation of claim 1, the formulation including an iodide salt as a source of the iodide ions.

8. The aqueous acidic formulation according to claim 7, the iodide salt including at least one of: an alkali metal iodide salt; an ammonium iodide salt; or a substituted (alkylated) ammonium iodide salt.

9. The aqueous acidic formulation of claim 1, at least one of the following being a source of the copper ions:
    a copper halide;
    a copper oxide; or
    a copper oxy-anion salt.

10. The aqueous acidic formulation of claim 1, the polymeric acid corrosion inhibitor including a polymer having a backbone including a continuous chain of carbon atoms, carbon and oxygen atoms, carbon and nitrogen atoms, or a combination thereof.

11. The aqueous acidic formulation of claim 1, the polymer being modified with one or more of: alkyl groups; aromatic groups; alkyl-aromatic groups; alkyl amino groups; pyrrolidone groups; or acetylenic alcohol groups.

12. The aqueous acidic formulation of claim 11, the polymer that is modified including one or more of polyallylamine; poly(vinylamine) hydrochloride; poly(l-lysine) hydrobromide; polydiallyldimethylammonium chloride;

polyvinylpyridine (PVPy); polyvinylquinoline (PVQ); polyvinylpyrrolidone (PVP); polyvinylcaprolactam (PVC); chitosan;
 aminated cellulose; aminated starch; polyethylenimine (PEI); or polypropylenimine (PPI).

13. The aqueous acidic formulation of claim 1, the polymer being modified with one or more of: pyridyl; quinolyl; hydrogenated pyridyl; or hydrogenated quinolyl groups.

14. The aqueous acidic formulation of claim 1, the composition of the aqueous acid formulation being configured to, when contacting a treating surface, provide an open circuit potential (OCP) that drops to within ±15% of the baseline-OCP for the treating surface in contact with uninhibited acid.

15. The aqueous acidic formulation of claim 1, the molar ratio of the copper ions to the iodide ions being between 1:10 and 1:100.

16. The aqueous acidic formulation of claim 1, the polymeric acid corrosion inhibitor being a naphthylmethyl modified polymeric acid corrosion inhibitor.

17. The aqueous acidic formulation of claim 16, the naphthylmethyl modified polymeric acid corrosion inhibitor being entirely soluble in the aqueous acidic formulation and having a degree of modification in a range of greater than 0 mol % to 25 mol %.

* * * * *